(12) United States Patent
Masuda et al.

(10) Patent No.: US 9,904,820 B2
(45) Date of Patent: Feb. 27, 2018

(54) COMMUNICATION DEVICE, COMMUNICATION METHOD, INTEGRATED CIRCUIT, AND ELECTRONIC INSTRUMENT

(71) Applicant: SONY CORPORATION, Tokyo (JP)

(72) Inventors: Kotaro Masuda, Tokyo (JP); Tetsuro Akaida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/441,321

(22) PCT Filed: Nov. 28, 2013

(86) PCT No.: PCT/JP2013/082014
§ 371 (c)(1),
(2) Date: May 7, 2015

(87) PCT Pub. No.: WO2014/091934
PCT Pub. Date: Jun. 19, 2014

(65) Prior Publication Data
US 2015/0254481 A1 Sep. 10, 2015

(30) Foreign Application Priority Data

Dec. 12, 2012 (JP) ................................. 2012-271030

(51) Int. Cl.
*H04Q 5/22* (2006.01)
*G06K 7/10* (2006.01)
*H04B 5/00* (2006.01)

(52) U.S. Cl.
CPC ..... *G06K 7/10297* (2013.01); *G06K 7/10366* (2013.01); *H04B 5/0062* (2013.01); *H04B 5/0081* (2013.01)

(58) Field of Classification Search
CPC ........... G06K 7/10297; G06K 7/10366; H04B 5/0075; H04B 5/0062

(Continued)

(56) References Cited

U.S. PATENT DOCUMENTS

2006/0049916 A1 3/2006 Kuriki
2006/0280149 A1* 12/2006 Kuhl .................... G06K 7/0008
370/338

(Continued)

FOREIGN PATENT DOCUMENTS

CN 1802654 A 7/2006
JP 2002-024778 1/2002

(Continued)

OTHER PUBLICATIONS

Jun. 10, 2016, European Search Report for related EP Application No. 13863384.7.

(Continued)

*Primary Examiner* — Dhaval Patel
(74) *Attorney, Agent, or Firm* — Paratus Law Group, PLLC

(57) ABSTRACT

The present technology relates to a communication device, a communication method, an integrated circuit, and an electronic instrument, which are capable of reducing a manufacturing cost of a communication device having both functions of an RF tag and reader/writer or an electronic instrument equipped with the communication device. A transmitting circuit transmits transmission data to a communication target by performing load modulation of changing an impedance of an antenna unit according to the transmission data using a first carrier generated in the antenna unit when the transmitting circuit operates in a first operation mode in which the transmitting circuit operates as an RFID reader/writer is performed, and the transmitting circuit transmits the transmission data to the RFID reader/writer by performing the load modulation of changing the impedance of the antenna unit according to the transmission data using a second carrier received by the antenna unit when the transmitting circuit operates in a second operation mode in which the transmitting circuit operates as a com- (Continued)

munication target of the RFID reader/writer is performed. For example, the present technology can be applied to a communication device having both functions of a reader/writer and an RF tag or an electronic instrument equipped with the communication device.

16 Claims, 11 Drawing Sheets

(58) Field of Classification Search
USPC ..... 340/10.51, 10.42, 5.85, 10.1, 10.4, 10.2, 340/572.3, 676.1; 375/219, 295, 232, 375/316; 455/41.1, 41.2, 296, 410, 556.1
See application file for complete search history.

(56) References Cited

U.S. PATENT DOCUMENTS

| | | | |
|---|---|---|---|
| 2007/0194936 A1* | 8/2007 | Hoshina | G06K 7/10237 340/572.8 |
| 2009/0224893 A1 | 9/2009 | Kondo et al. | |
| 2010/0134256 A1* | 6/2010 | Mihota | H04B 3/142 340/10.1 |
| 2011/0241837 A1* | 10/2011 | Suzuki | G06K 7/0008 340/10.1 |
| 2012/0206243 A1* | 8/2012 | Butler | G06K 7/0008 340/10.51 |
| 2012/0220227 A1* | 8/2012 | Dobyns | H04B 5/0031 455/41.1 |

FOREIGN PATENT DOCUMENTS

| | | |
|---|---|---|
| JP | 2007-219585 | 8/2007 |
| JP | 2008-010011 | 1/2008 |
| JP | 2010-050515 | 3/2010 |

OTHER PUBLICATIONS

Mar. 23, 2017, JP communication issued for related JP application No. 2014-551967.
May 22, 2017, CN communication issued for related CN application No. 201380063335.1.

* cited by examiner

COMMUNICATION DEVICE, COMMUNICATION METHOD, INTEGRATED CIRCUIT, AND ELECTRONIC INSTRUMENT

CROSS REFERENCE TO PRIOR APPLICATION

This application is a National Stage Patent Application of PCT International Patent Application No. PCT/JP2013/082014 (filed on Nov. 28, 2013) under 35 U.S.C. § 371, which claims priority to Japanese Patent Application No. 2012-271030 (filed on Dec. 12, 2012), which are all hereby incorporated by reference in their entirety.

TECHNICAL FIELD

The present technology relates to a communication device, a communication method, an integrated circuit, and an electronic instrument, and more particularly, to a communication device, a communication method, an integrated circuit, and an electronic instrument, which are capable of reducing a manufacturing cost.

BACKGROUND ART

In recent years, a technique called a radio frequency identification (RFID) used in an RF tag, a non-contact type IC card, and the like has spread. For example, an RF tag includes an antenna therein, and performs near field communication with a dedicated reader/writer using a weak radio wave.

Among RF tags, there is an RF tag having a function of a reader/writer communicating with another RF tag as well as a function of an RF tag communicating with a dedicated reader/writer. Such an RF tag operates as an RF tag or a reader/writer according to a use state.

The present applicant has previously proposed a communication device having a function of an IC card (RF tag) and a function of a reader/writer (for example, see Patent Document 1). FIG. 1 illustrates a configuration of a communication device 1 having both functions of an RF tag and a reader/writer.

As illustrated in FIG. 1, the communication device 1 includes an antenna circuit 11, an integrated circuit 12, a host controller 13, a power source 14, an oscillating circuit 15, and a crystal oscillator 16. The antenna circuit 11 includes a coil 31 and a capacitor 32 and forms a parallel resonant circuit. The power source 14 supplies the integrated circuit 12 and the host controller 13 with electric power. The oscillating circuit 15 generates a carrier of a frequency (13.56 MHz) corresponding to a vibration frequency of the crystal oscillator 16.

The integrated circuit 12 modulates transmission data according to control of the host controller 13, and transmits a modulated signal obtained by the modulating to a communication destination through the antenna circuit 11. Further, the integrated circuit 12 receives a modulated signal from a communication destination through the antenna circuit 11 according to control of the host controller 13, and demodulates the modulated signal.

The integrated circuit 12 includes a control unit 51 that controls respective units, a non-volatile memory 52 that appropriately stores various kinds of data, a data input circuit 53 that receives transmission data, and a data output circuit 54 that outputs reception data The control unit 51 includes a mode control unit 71 and a communication control unit 72. The mode control unit 71 controls switching operations of a switch 55 and a switch 56 according to control of the host controller 13. The communication control unit 72 not only controls an input and output of the transmission data and the reception data but also performs various kinds of processes on the data.

Here, an operation mode of the communication device 1 includes a reader/writer mode in which the communication device 1 operates as a reader/writer and a tag mode in which the communication device 1 operates as an RF tag. To this end, the integrated circuit 12 is provided with a transmitting circuit 57 serving as a circuit for a reader/writer function, a transmitting circuit 61 serving as a circuit for an RF tag function, and a receiving circuit 63 serving as a circuit for both functions.

When an operation is performed the reader/writer mode, the transmitting circuit 57 performs Amplitude Shift Keying (ASK) (hereinafter, referred to as an "ASK modulation") on the transmission data supplied from the communication control unit 72 according to a carrier generated by the oscillating circuit 15. At this time, in order to perform the ASK modulation through the transmitting circuit 57 while generating the carrier through the oscillating circuit 15, it is necessary to compulsorily change a level of the carrier while driving the carrier at low impedance. To this end, transmitting buffer circuits 58 and 59 are provided so that the carrier can be driven at the low impedance. As a result, the modulated signal obtained by the ASK modulation is transmitted to the RF tag of the communication destination through a filter circuit 60 and the antenna circuit 11.

When an operation is performed in the tag mode, the transmitting circuit 61 performs load modulation on reply transmission data supplied from the communication control unit 72 according to a clock signal extracted by a clock extracting circuit 62, and applies the modulated data to the coil 31 of the antenna circuit 11. As a result, the reply transmission data is transmitted to the reader/writer of the communication destination.

The receiving circuit 63 is a circuit that is used in both operation modes of the reader/writer mode and the tag mode. When an operation is performed in the tag mode or the reader/writer mode, the receiving circuit 63 receives a modulated signal transmitted from a communication destination through the antenna circuit 11 and the filter circuit 60, demodulates the modulated signal, and supplies reception data obtained by the demodulating to the communication control unit 72.

As described above, the communication device is configured to have both functions of the RF tag and the reader/writer.

CITATION LIST

Patent Document

Patent Document 1: CP 4797991 B1

SUMMARY OF THE INVENTION

Problems to be Solved by the Invention

Meanwhile, in the communication device 1 of FIG. 1, a modulation scheme in the case where the communication device 1 operates as the reader/writer is different from that in the case where the communication device 1 operates as the RF tag, and thus it is necessary to install a plurality of transmitting circuits according to the modulation schemes.

Specifically, the ASK modulation is used as the modulation scheme when the communication device 1 operates as the reader/writer, and the load modulation is used as the modulation scheme when the communication device 1 operates as the RF tag, and thus it is necessary to install the transmitting circuit 57 for the reader/writer function and the transmitting circuit 61 for the RF tag function separately. For this reason, there is a demand for commonalizing the dedicated transmitting circuits and reducing a manufacturing cost.

The present technology was made in light of the foregoing, and it is desirable to reduce a manufacturing cost of a communication device having both functions of an RF tag and reader/writer or an electronic instrument including the communication device.

Solutions to Problems

A communication device according to an aspect of the present technology includes an antenna unit; a transmitting unit that modulates transmission data, and transmits the transmission data to a communication destination through the antenna unit; and a receiving unit that receives modulated reception data from the communication destination through the antenna unit, and demodulates the modulated reception data, wherein the transmitting unit and the receiving unit operate in any one of a first operation mode in which an operation of a radio frequency identification (RFID) reader/writer is performed and a second operation mode in which an operation of a communication target of the RFID reader/writer is performed, the transmitting unit transmits the transmission data to the communication target by performing load modulation of changing an impedance of the antenna unit according to the transmission data using a first carrier generated in the antenna unit when the transmitting unit operates in the first operation mode, and the transmitting unit transmits the transmission data to the RFID reader/writer by performing the load modulation of changing the impedance of the antenna unit according to the transmission data using a second carrier received by the antenna unit when the transmitting unit operates in the second operation mode.

The communication device further includes a carrier generating unit that generates the first carrier.

The carrier generating unit causes the impedance of the antenna unit to have a value of a predetermined magnitude.

The first carrier is generated by an external carrier generating device.

The transmission data and the reception data are encoded by the same coding scheme.

The communication device further includes a voltage setting unit that restricts a power voltage generated by electromagnetic induction of the antenna unit according to the operation mode.

The communication device may be art independent device or may be an internal block configuring a single device.

A communication method and an electronic instrument according to an aspect of the present technology are a communication method and an electronic instrument corresponding to the communication device according to an aspect of the present technology.

An integrated circuit according to an aspect of the present technology includes: a transmitting circuit that modulates transmission data, and transmits the transmission data to a communication destination through an external antenna circuit; and a receiving circuit that receives modulated reception data from the communication destination through the antenna circuit, and demodulates the modulated reception data, wherein the transmitting circuit and the receiving circuit operate in any one of a first operation mode in which an operation of an RFID reader/writer is performed and a second operation mode in which an operation of a communication target of the RFID reader/writer is performed, the transmitting circuit transmits the transmission data to the communication target by performing load modulation of changing an impedance of the antenna circuit according to the transmission data using a first carrier generated in the antenna circuit when the transmitting circuit operates in the first operation mode, and the transmitting circuit transmits the transmission data to the RFID reader/writer by performing the load modulation of changing the impedance of the antenna circuit according to the transmission data using a second carrier received by the antenna circuit when the transmitting circuit operates in the second operation mode.

The first carrier is generated by an external carrier generating circuit.

The carrier generating circuit causes the impedance of the antenna circuit to have a value of a predetermined magnitude.

The transmission data and the reception data are encoded by the same coding scheme.

The integrated circuit further includes a voltage setting circuit that restricts a power voltage generated by electromagnetic induction of the antenna circuit according to the operation mode.

A communication method according to an aspect of the present technology is a communication method corresponding to the integrated circuit according to an aspect of the present technology.

In the communication device, the communication method, the integrated circuit, and the electronic instrument according to an aspect of the present technology, the transmission data is transmitted to the communication target by performing the load modulation of changing the impedance of the antenna unit according to the transmission data using the first carrier generated in the antenna unit when the operation is performed in the first operation mode, and the transmission data is transmitted to the RFID reader/writer by performing the load modulation of changing the impedance of the antenna unit according to the transmission data using the second carrier received by the antenna unit when the operation is performed in the second operation mode.

Effects of the Invention

According to an aspect of the present technology, it is possible to reduce a manufacturing cost of a communication device having both functions of en RF tag and reader/writer or an electronic instrument equipped with the communication device.

MODE FOR CARRYING OUT THE INVENTION

Hereinafter, preferred embodiments of the present technology will be described with reference to the appended drawings.

First Embodiment

<Configuration of Communication Device>

Figure 2:
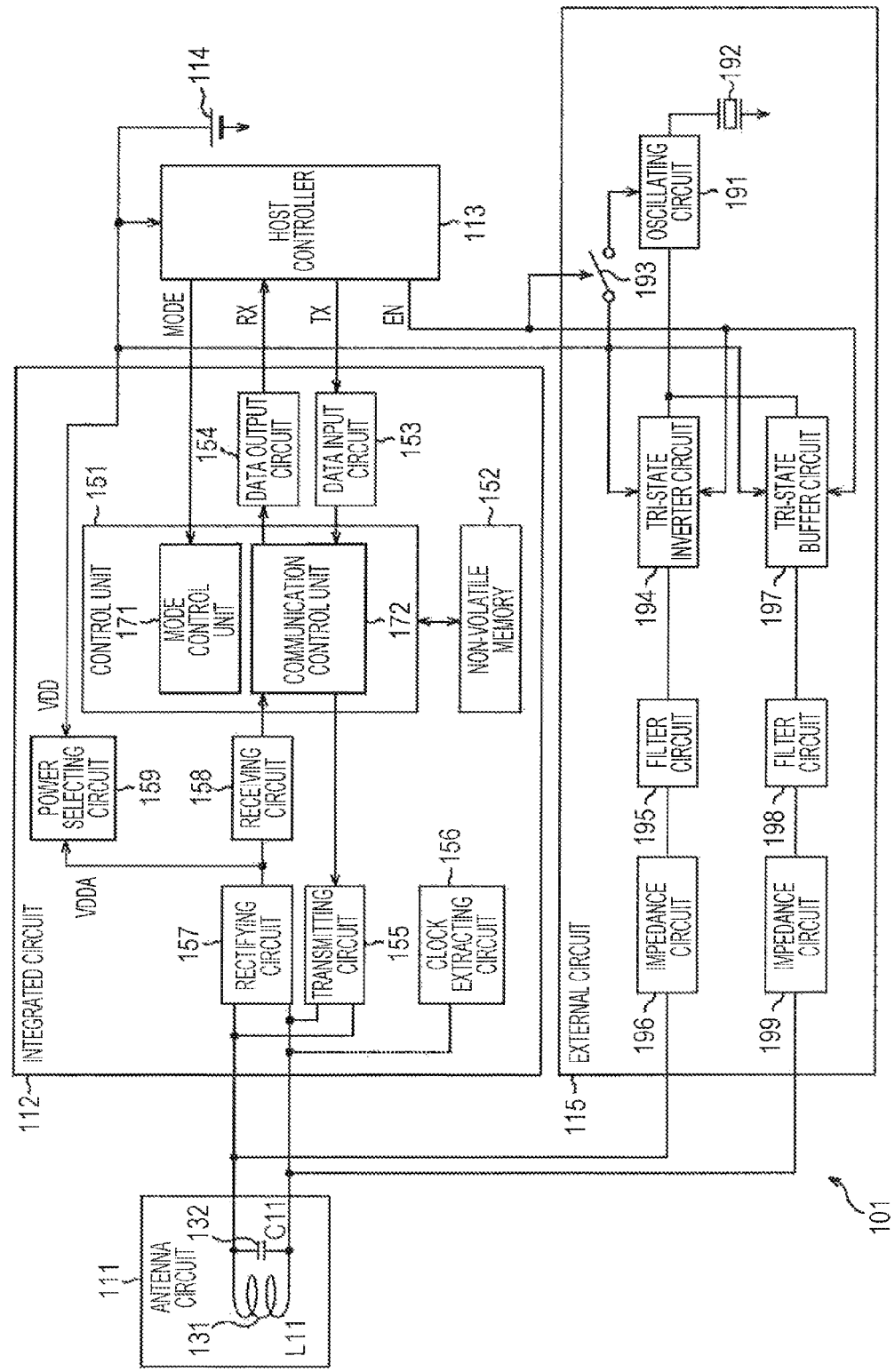
FIG. 2 is a diagram illustrating a configuration of a communication device according to an embodiment of the present technology.

FIG. 2 is a diagram illustrating a configuration of a communication device according to an embodiment of the present technology.

As illustrated in FIG. 2, a communication device 101 includes an antenna circuit 111, an integrated circuit 112, a host controller 113, a power source 114, and an external circuit 115.

The antenna circuit 111 includes a coil 131 and a capacitor 132 that perform a parallel resonant circuit. In FIG. 2, L11 indicates inductance of the coil 131, and C11 indicates capacitance of the capacitor 132. The antenna circuit 111 is adjusted to an inductor value at which a magnetic field of 13.56 MHz can be efficiently received, and an effect thereof can be increased by a variable capacitor.

The integrated circuit 112 is a circuit having both functions of an RF tag and a reader/writer and configured as a so-called IC chip. The integrated circuit 112 modulates input transmission data according to control of the host controller 113, and transmits a modulated signal obtained by the modulating to a communication destination through the antenna circuit 111. The integrated circuit 112 receives a modulated signal transmitted from a communication destination through the antenna circuit 111 according to control of the host controller 113, demodulates the modulated signal, and outputs reception data obtained by the demodulating.

The host controller 113 controls operations of the respective units of the communication device 101. Specifically, the host controller 113 supplies a control signal (MODE) or a transmission data (TX) to the integrated circuit 112 according to an operation state of the communication device 101, and supplies a control signal (EN) to the external circuit 115. The host controller 113 acquires reception data (RX) supplied from the integrated circuit 112, and performs various kinds of processes.

The power source 114 supplies a power voltage (VDD) to the integrated circuit 112, the host controller 113, and the external circuit 115 as a DC voltage necessary for operating the respective circuits.

When the communication device 101 operates in a reader/writer mode which will be described later, the external circuit 115 generates a carrier (a carrier wave) of a predetermined frequency (13.56 MHz) and applies the generated carrier (carrier wave) to the antenna circuit 111 according to control of the host controller 113. As a result, when the operation is performed in the reader/writer mode, the antenna circuit 111 radiates the carrier regularly.

The integrated circuit 112 includes a control unit 151, a non-volatile memory 152, a data input circuit 153, a data output circuit 154, a transmitting circuit 155, a clock extracting circuit 156, a rectifying circuit 157, a receiving circuit 158, and a power selecting circuit 159.

The control unit 151 controls operations of the respective units of the integrated circuit 112. The non-volatile memory 152 holds various kinds of data according to control of the control unit 151.

The data input circuit 153 and the data output circuit 154 are provided for the interface with the host controller 113. The data input circuit 153 supplies the transmission data (TX) received from the host controller 113 to the control unit 151. The data output circuit 154 supplies the reception data (RX) received from the control unit 151 to the host controller 113.

The control unit 151 is configured to include a mode control unit 171 and a communication control unit 172. The mode control unit 171 controls the operation mode of the integrated circuit 112 according to the control signal (MODE) given from the host controller 113. The operation mode includes a reader/writer mode (a first operation mode) in which the communication device 101 operates as a reader/writer and a tag mode (a second operation mode) in which the communication device 101 operates as an RF tag.

The communication control unit 172 performs transmission control such that transmission data is transmitted. At this time, the communication control unit 172 encodes transmission data received from the data input circuit 153 according to a coding scheme called a Manchester scheme, and then supplies the encoded transmission data to the transmitting circuit 155. Further, the communication control unit 172 performs reception control such that reception data is received. At this time, the communication control unit 172 decodes Manchester-encoded reception data received from the receiving circuit 158, and supplies the decoded reception data to the data output circuit 154. In other words, in the Near Field communication between the communication device 101 and the communication destination, the same coding scheme is used at the time of data transmission and data reception according to a predetermined standard.

The transmitting circuit 155 is a circuit that performs data transmission modulation that is used in both operation modes of the reader/writer mode and the tag mode. When the operation is performed in the reader/writer mode and it enters a communicable state with an RF tag of a communication destination, the transmitting circuit 155 performs load modulation of changing the impedance of the parallel resonant circuit of the antenna circuit 111 according to the transmission data received from the communication control unit 172 using the carrier generated in the antenna circuit 111 through the external circuit 115. As a result, the modulated signal is transmitted from the communication device 101 to the RF tag of the communication destination.

Further, when the transmitting circuit 155 operates in the tag mode, the carrier from the reader/writer of the communication destination is received by the antenna circuit 111. The transmitting circuit 155 performs load modulation of changing the impedance of the parallel resonant circuit of the antenna circuit 111 according to reply transmission data received from the communication control unit 172 using the received carrier. As a result, the modulated signal is transmitted from the communication device 101 to the reader/writer of the communication destination.

When the operation is performed in the tag mode, the clock extracting circuit 156 extracts a clock signal based on the carrier received from the reader/writer of the communication destination, and supplies the extracted clock signal to the respective units of the integrated circuit 112 such as the transmitting circuit 155. The respective units of the integrated circuit 112 perform various kinds of operations according to the clock signal extracted by the clock extracting circuit 156.

The rectifying circuit 157 converts a received AC voltage generated in the antenna circuit 111 by the reader/writer of the communication destination into a DC voltage, and supplies the DC voltage to the receiving circuit 153 and the power selecting circuit 159.

The receiving circuit 158 is a circuit that performs data reception demodulation that is used in both operation modes of the reader/writer mode and the tag mode. When the receiving circuit 158 operates in the reader/writer mode, the modulated signal generated by the load modulation performed by the RF tag of the communication destination is induced in the antenna circuit 111. The receiving circuit 150 demodulates the modulated signal generated in the antenna circuit 111 based on an output from the rectifying circuit 157, and supplies reception data obtained by the demodulating to the communication control unit 172.

Further, when the receiving circuit 158 operates in the tag mode, the modulated signal modulated by the reader/writer of the communication destination is received by the antenna circuit 111. The receiving circuit 158 demodulates the modulated signal received by the antenna circuit 111 based on an output from the rectifying circuit 157, and supplies reception data obtained by the demodulating to the communication control unit 172.

The power voltage (VDD) from the power source 114 and the DC voltage (the power voltage: VDDA) from the rectifying circuit 157 are supplied to the power selecting circuit 159. The power selecting circuit 159 selects the higher of the power voltages, and supplies the selected power voltage to the respective units of the integrated circuit 112.

The external circuit 115 includes an oscillating circuit 191, a crystal oscillator 192, a switch 193, a tri-state inverter circuit 194, a filter circuit 195, an impedance circuit 196, a tri-state buffer circuit 197, a filter circuit 198, and an impedance circuit 199.

The oscillating circuit 191 generates an oscillation signal corresponding to a vibration frequency of the crystal oscillator 192, and supplies the oscillation signal to the tri-state inverter circuit 194 and the tri-state buffer circuit 197.

One terminal of the switch 193 is connected to the oscillating circuit 191, and the other terminal thereof is connected to the power source 114. The switch 193 controls the power voltage (VDD) to be supplied to the oscillating circuit 191 by performing a switching operation according to the control signal (EN) given from the host controller 113.

The tri-state inverter circuit 194 changes an output state thereof according to the control signal (EN) given from the host controller 113. In the case of a normal output state, the tri-state inverter circuit 194 inverts the oscillation signal received from the oscillating circuit 191, and supplies the inverted oscillation signal to the filter circuit 195. Further, in the case of a high impedance output state, the tri-state inverter circuit 194 does not function as an inverter, and has an output of a high impedance state. Furthermore, the tri-state inverter circuit 194 operates based on the power voltage (VDD) supplied from the power source 114.

The filter circuit 195 generates a carrier (sine wave) of 13.56 MHz based on the normal output from the tri-state inverter circuit 194, and supplies the generated carrier to the impedance circuit 196.

The tri-state buffer circuit 197 changes an output state thereof according to the control signal (EN) given from the host controller 113. In the case of the normal output state, the tri-state buffer circuit 197 supplies the oscillation signal received from the oscillating circuit 191 to the filter circuit 198. Further, in the case of the high impedance output state, the tri-state buffer circuit 197 does not function as a buffer, and has an output of a high impedance state. Furthermore, the tri-state buffer circuit 197 operates based on the power voltage (VDD) supplied from the power source 114.

The filter circuit 198 generates a carrier (sine wave) of 13.56 MHz based on the normal output from the tri-state buffer circuit 197, and supplies the generated carrier to the impedance circuit 199.

An output terminal of the impedance circuit 196 is connected to one terminal (an upper terminal in FIG. 2) of the antenna circuit 111, and an output terminal of the impedance circuit 199 is connected to the other terminal (a lower end in FIG. 2) of the antenna circuit 111. Thus, the carrier of 13.56 MHz based on the outputs of the filter circuit 195 and the filter circuit 198 is generated in the antenna circuit 111. Further, it is possible to cause the impedance of the parallel resonant circuit of the antenna circuit 111 to have a value of a predetermined magnitude through the impedance circuit 196 and the impedance circuit 199. It is found by a detailed simulation performed by the inventor (s) of the present technology that it is desirable to have a magnitude of about several hundreds to 1 KΩ as the impedance.

A configuration of the communication device 101 will be described below.

<Configuration of Transmitting Circuit>

Next, a detailed configuration of the transmitting circuit 155 of FIG. 2 will be described with reference to FIGS. 3 to 7.

(Resistor+MOS Switch Type)

Figure 3:
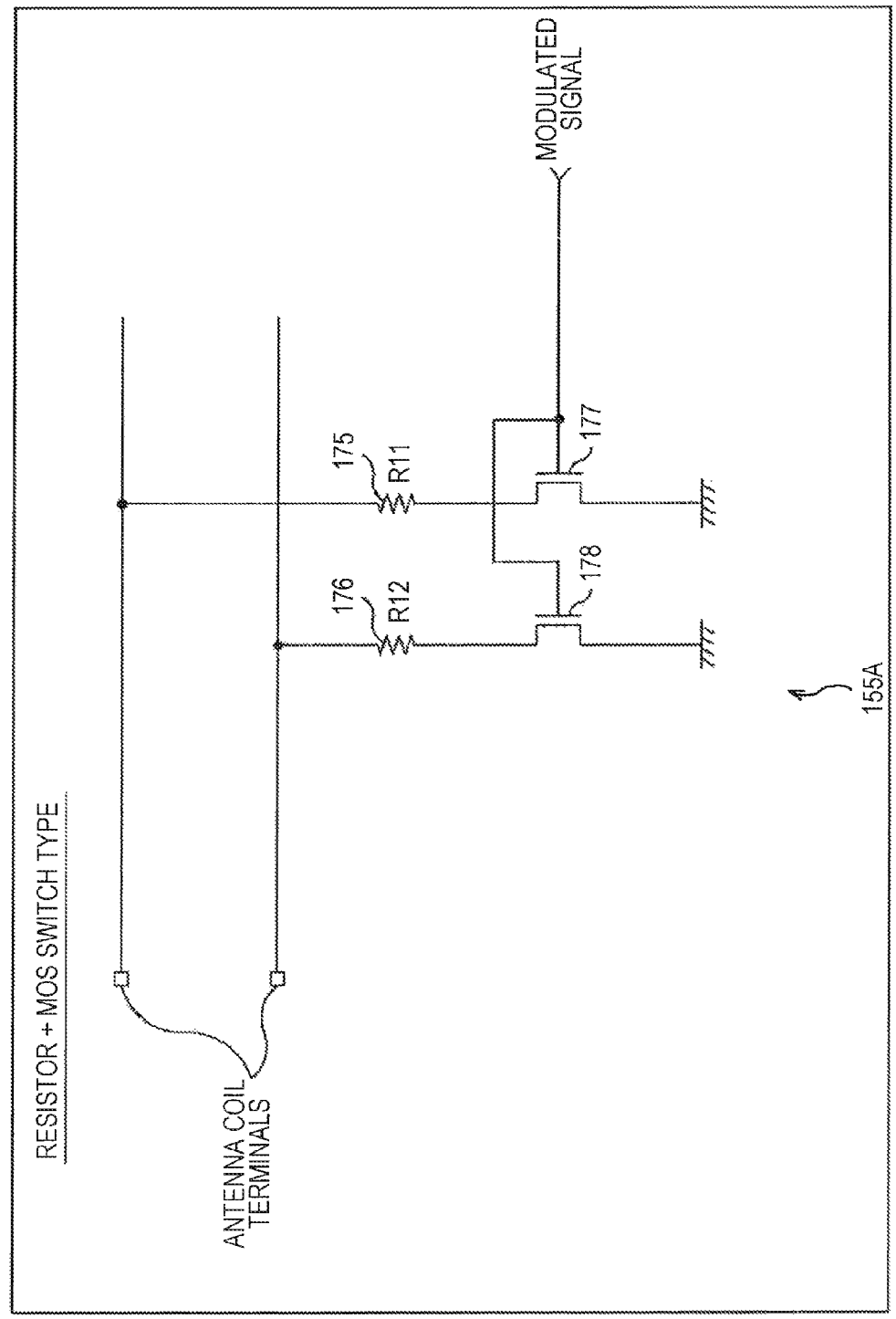
FIG. 3 is a diagram illustrating an exemplary configuration of a transmitting circuit.

FIG. 3 is a diagram illustrating a configuration of a transmitting circuit 155A including a resistor and a MOS switch. As illustrated in FIG. 3, the transmitting circuit 155A is configured such that a resistor 175 is connected with a MOS transistor 177 in series, and a resistor 176 is connected with a MOS transistor 178 in series. Here, in FIG. 3, R11 indicates a resistance value of the resistor 175, and R12 indicates a resistance value of the resistor 176.

One terminal of the resistor 175 is connected to one terminal (the upper terminal in FIG. 3) of the coil 131 of the antenna circuit 111, and the other terminal thereof is connected to a drain terminal of the MOS transistor 177. The drain terminal of the MOS transistor 177 is connected to the other terminal of the resistor 175, and a source terminal thereof is grounded. Further, a signal indicating "1" or "0" according to the transmission data received from the communication control unit 172, that is, the modulated signal is supplied to the gate terminal of the MOS transistor 177. The MOS transistor 177 performs an ON/OFF switching operation according to the modulated signal of "1" or "0".

Further, one terminal of the resistor 176 is connected to the other terminal (the lower terminal in FIG. 3) of the coil 131 of the antenna circuit 111, and the other terminal thereof is connected to a drain terminal of the MOS transistor 178. The drain terminal of the MOS transistor 178 is connected to the other terminal of the resistor 176, and a source terminal thereof is grounded. Further, the modulated signal from the communication control unit 172 is supplied to the gate terminal of the MOS transistor 178. The MOS transistor 178 performs the ON/OFF switching operation according to the modulated signal of "1" or "0".

Through the above configuration, for example, when the MOS transistors 177 and 178 are switched from the ON state to the off state, the impedance of the parallel resonant circuit of the antenna circuit 111 is changed. As a result, the carrier generated in the antenna circuit 111 is changed, and the load modulation is performed.

(Capacitor+MOS Switch Type)

Figure 4:
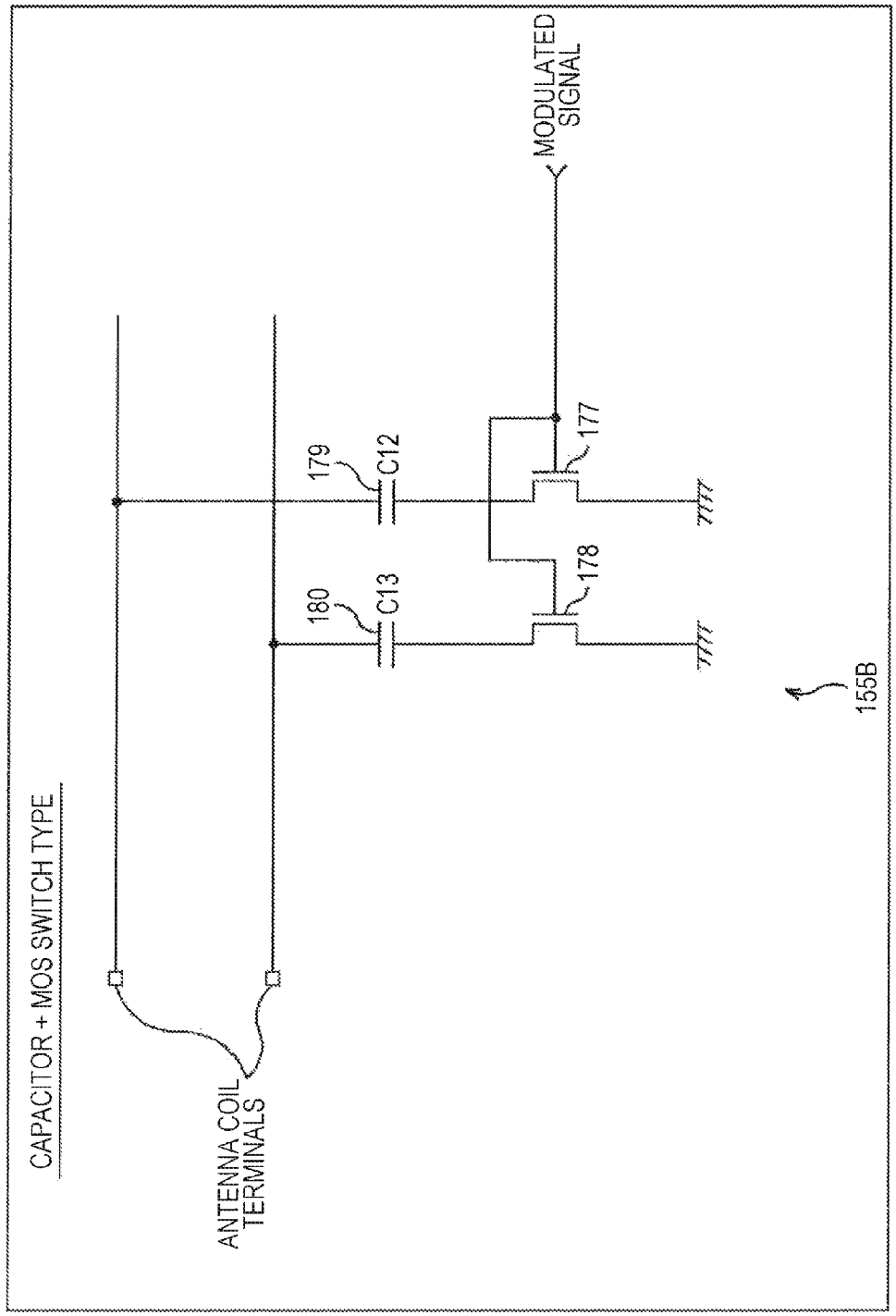
FIG. 4 is a diagram illustrating an exemplary configuration of a transmitting circuit.

FIG. 4 is a diagram illustrating a configuration of a transmitting circuit 155B including a capacitor and a MOS switch. As illustrated in FIG. 4, the transmitting circuit 155B is configured such that a capacitor 179 is connected with a MOS transistor 177 in series, and a capacitor 180 is connected with a MOS transistor 178 in series. Here, in FIG. 4, C12 indicates a capacitance of the capacitor 179, and C13 indicates a capacitance of the capacitor 100.

The MOS transistor 177 has basically the same connection relation as in FIG. 3, but one terminal of the capacitor 179 is connected to a drain terminal of the MOS transistor 177. Further, the other terminal of the capacitor 179 is connected to one terminal (the upper terminal in FIG. 4) of the coil 131 of the antenna circuit 111. Similarly, the MOS transistor 178 has basically the same connection relation as in FIG. 3, but one terminal of the capacitor 100 is connected to a drain terminal of the MOS transistor 178. The other terminal of the capacitor 130 is connected to the other terminal (the lower terminal in FIG. 4) of the coil 131 of the antenna circuit 111.

In the transmitting circuit 155B, as the MOS transistors 177 and 178 perform the switching operation according to the modulated signal, the load modulation of changing the impedance of the parallel resonant circuit of the antenna circuit 111 is performed.

(Diode+MOS Switch Type)

Figure 5:
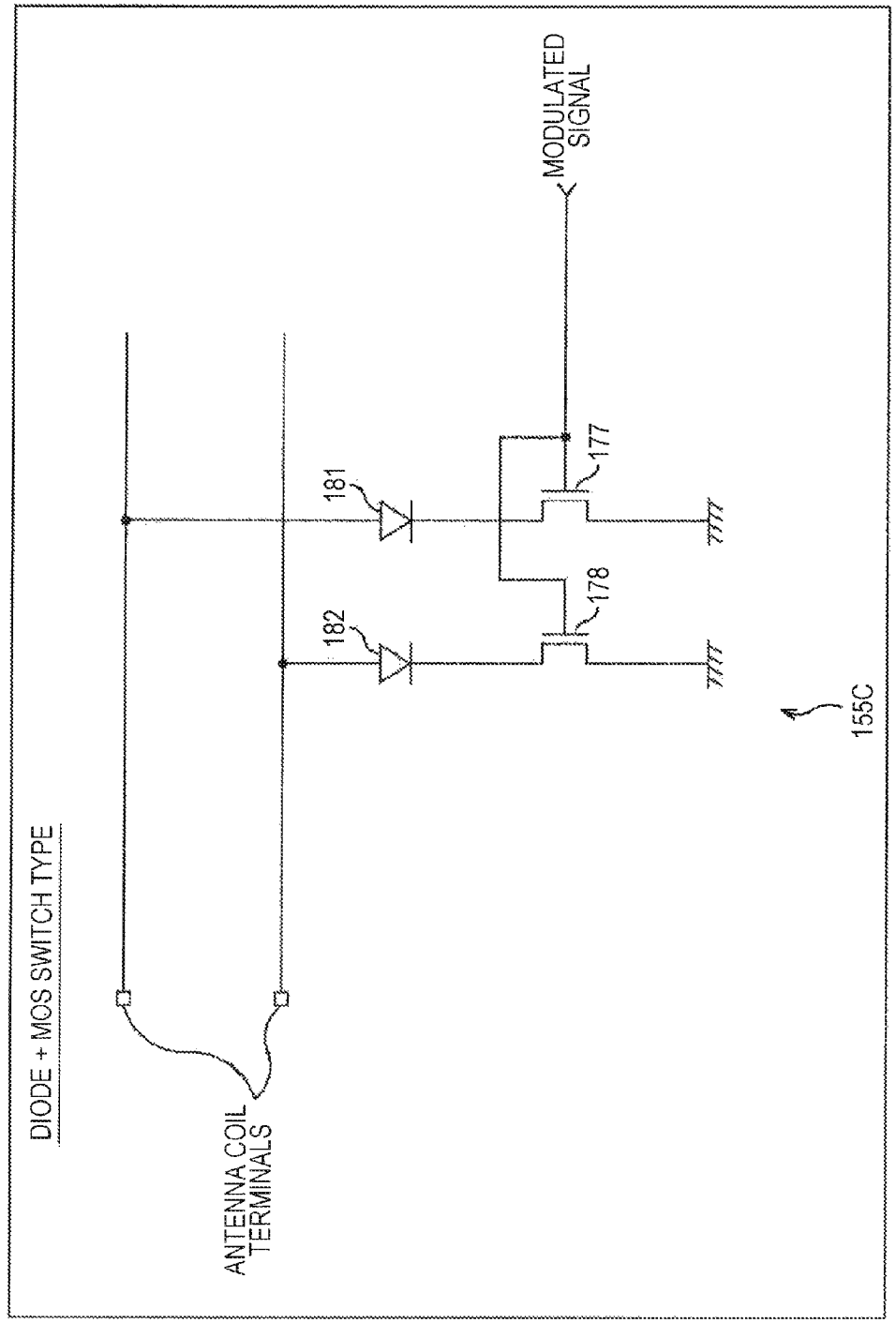
FIG. 5 is a diagram illustrating an exemplary configuration of a transmitting circuit.

FIG. 5 is a diagram illustrating a configuration of a transmitting circuit 155C including a diode and a MOS switch. As illustrated in FIG. 5, the transmitting circuit 155C is configured such that a diode 181 is connected with a MOS transistor 177 in series, and a diode 182 is connected with a MOS transistor 178 in series.

The MOS transistor 177 has basically the same connection relation as in FIG. 3, but a cathode side of the diode 181 is connected to a drain terminal of the MOS transistor 177. An anode side of the diode 181 is connected to one terminal (the upper terminal in FIG. 5) of the coil 131 of the antenna circuit 111. Similarly, the MOS transistor 178 has basically the same connection relation as in FIG. 3, but a cathode side of the diode 182 is connected to a drain terminal of the MOS transistor 178. An anode side of the diode 182 is connected to the other terminal (the lower terminal in FIG. 5) of the coil 131 of the antenna circuit 111.

In the transmitting circuit 155C, as the MOS transistors 177 and 178 perform the switching operation according to the modulated signal, the load modulation of changing the impedance of the parallel resonant circuit of the antenna circuit 111 is performed.

(Combination of Diode and Resistor MOS Switch Type)

Figure 6:
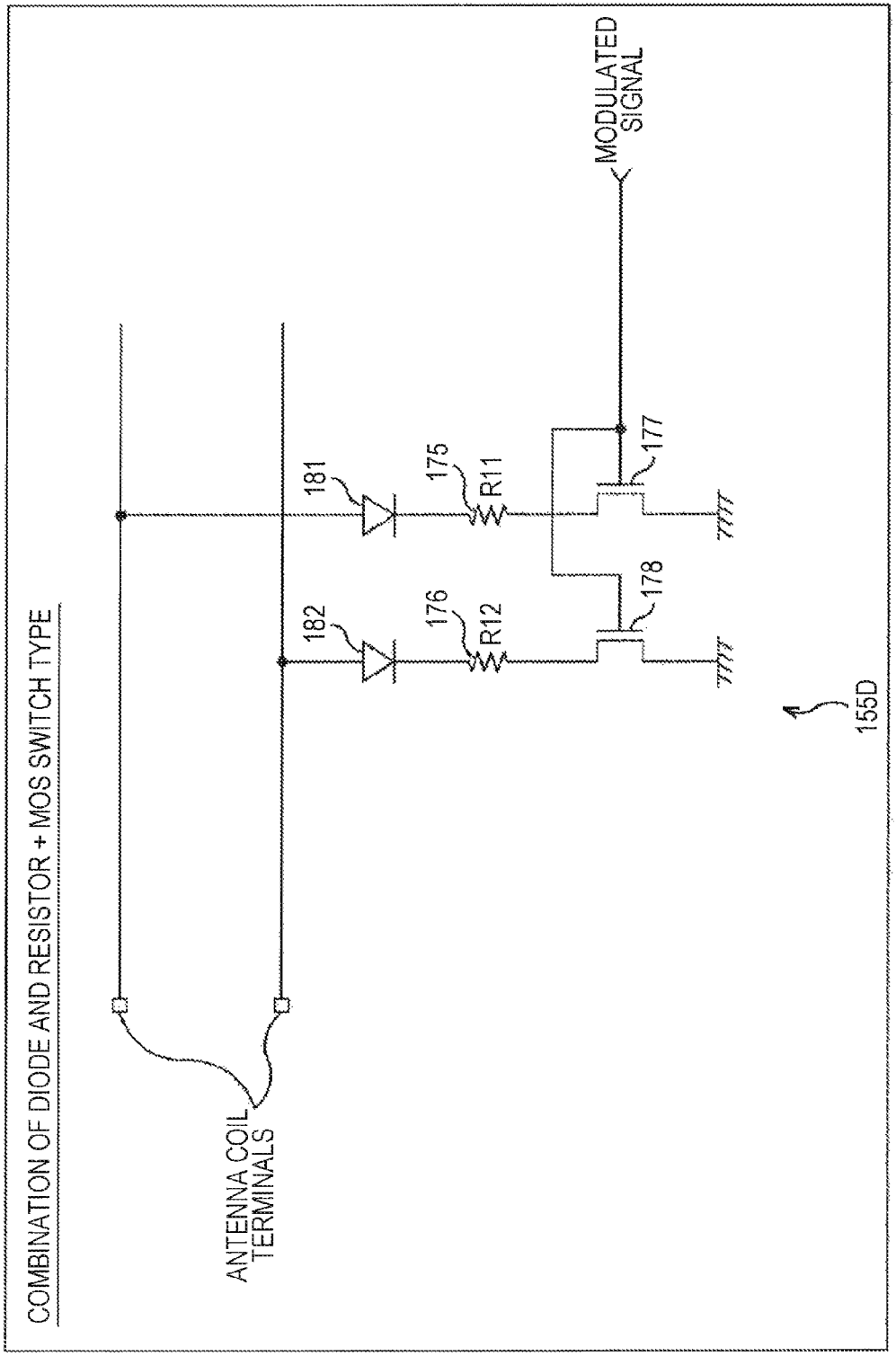
FIG. 6 is a diagram illustrating an exemplary configuration of a transmitting circuit.

FIG. 6 is a diagram illustrating a configuration of a transmitting circuit 155C including a combination of a diode and a resistor and a MOS switch. As illustrated in FIG. 6, the transmitting circuit 155C is configured such that a diode 181, a resistor 175, and a MOS transistor 177 are connected in series, and a diode 182, a resistor 176, and a MOS transistor 178 are connected in series.

The resistor 175 and the MOS transistor 177 have basically the same connection relation as in FIG. 3, but a cathode side of the diode 101 is connected to one terminal of the resistor 175. An anode side of the diode 101 is connected to one terminal (the upper terminal in FIG. 6) of the coil 131 of the antenna circuit 111. Similarly, the resistor 176 and the MOS transistor 178 have basically the same connection relation as in FIG. 3, but a cathode side of the diode 182 is connected to one terminal of the resistor 176. An anode side of the diode 182 is connected to the other terminal (the lower terminal in FIG. 6) of the coil 131 of the antenna circuit 111.

In the transmitting circuit 155D, as the MOS transistors 177 and 178 perform the switching operation according to the modulated signal, the load modulation of changing the impedance of the parallel resonant circuit of the antenna circuit 111 is performed.

(Feedback Control)

Figure 7:
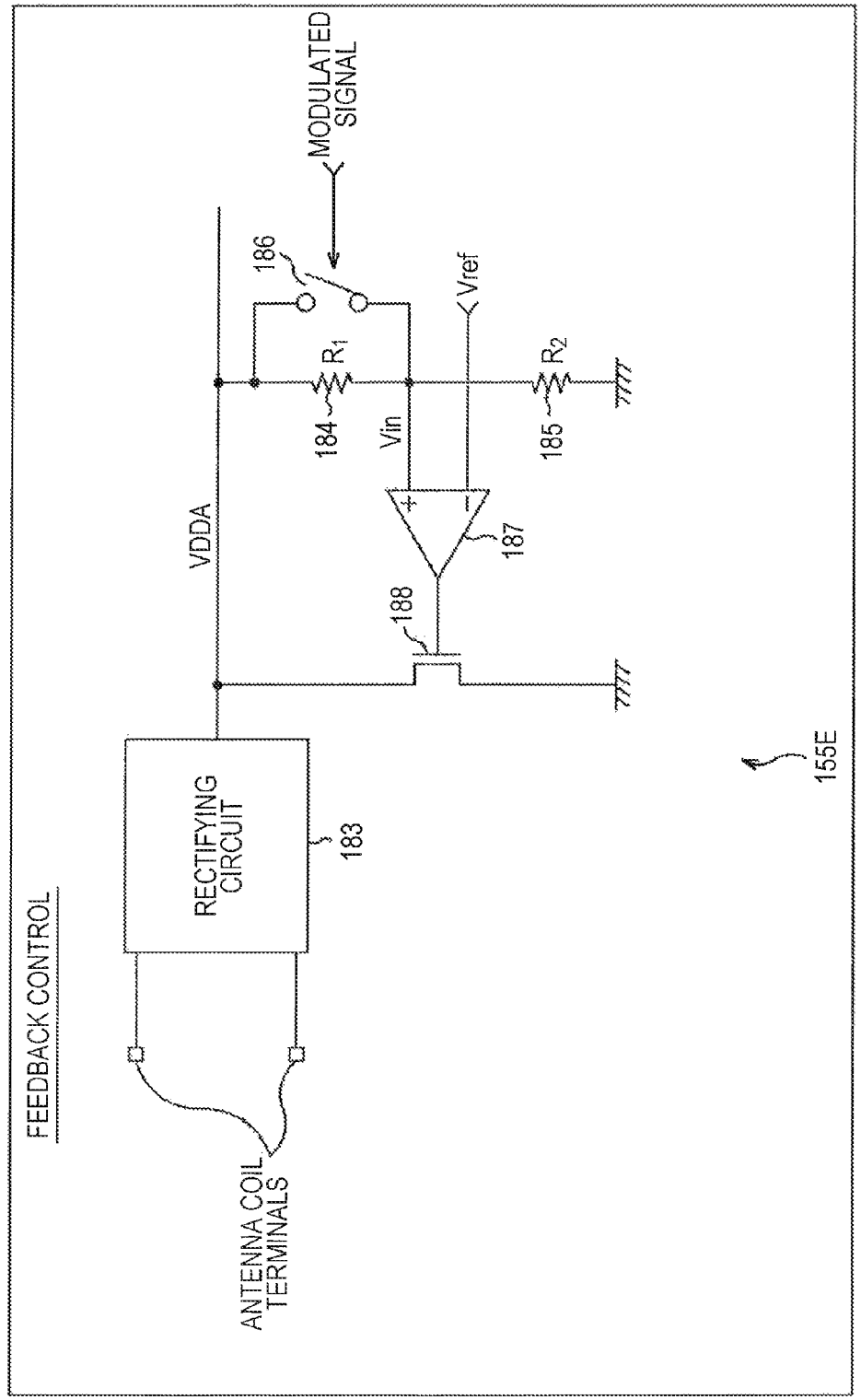
FIG. 7 is a diagram illustrating an exemplary configuration of a transmitting circuit.

FIG. 7 is a diagram illustrating a configuration of a transmitting circuit 155C that controls load modulation using feedback control. As illustrated in FIG. 7, the transmitting circuit 155E includes a rectifying circuit 183, a resistor 184, a resistor 185, a switch 186, an operational amplifier 187, and a MOS transistor 188. Here, in FIG. 7, $R_1$ indicates a resistance value of the resistor 184, and $R_2$ indicates a resistance value of the resistor 185.

One terminal of the resistor 184 is connected to an output terminal of the rectifying circuit 183, and the other terminal thereof is connected to one terminal of the resistor 185. The switch 186 is connected to both ends of the resistor 184. The other terminal of the resistor 185 is grounded.

One input terminal (a + terminal) of the operational amplifier 187 is connected between the resistor 184 and the resistor 185, and the other input terminal (a − terminal) is connected to a reference voltage circuit (not illustrated). An output terminal of the operational amplifier 187 is connected to a gate terminal of the MOS transistor 188 for voltage control.

A drain terminal of the MOS transistor 188 is connected to an output terminal of the rectifying circuit 183, and a source terminal thereof is grounded. A gate terminal of the MOS transistor 188 is connected to an output terminal of the operational amplifier 187.

In the transmitting circuit 155E having the above configuration, a signal (Vin) rectified by the rectifying circuit 183 and then divided by the resistor 184 and the resistor 185 is input to one input terminal (the + terminal) of the operational amplifier 187, and a certain reference voltage (Vref) is input to the other input terminal (the − terminal) of the operational amplifier 187 from the reference voltage circuit.

The modulated signal is used as a control signal for controlling an ON/OFF operation of the switch 186. Thus, the resistor 184 enters the effective state or the short-circuited state according to the switching operation of the switch 186. Then, when the resistor 184 enters the effective state ($R_1$=effective) and a gain of a feedback loop is sufficiently increased, Vin and Vref become the same potential, and a relation of the following Formula (1) is held.

[Mathematical Formula 1]

$$\frac{R_2}{R_1 + R_2} \cdot VDDA|_{R_1 = \text{effective}} = V_{ref} \qquad (1)$$

When Formula (1) is modified to represent VDDA, the following Formula (2) is obtained.

[Mathematical Formula 2]

$$VDDA_{|R_1 = \text{effective}} = \left(1 + \frac{R_1}{R_2}\right) \cdot Vref \quad (2)$$

Meanwhile, when the resistor 184 enters the short-circuited state ($R_1$=short) and the gain of the feedback loop is sufficiently increased, a relation of the following Formula (3) is held.

[Mathematical Formula 3]

$$VDDA_{|R1=Short} = Vref \quad (3)$$

In other words, in the transmitting circuit 155E, it is possible to obtains an amplitude difference of $R_1/R_2*Vref$ on the signal of VDDA by turning the switch 186 on or off by the modulated signal. Further, the amplitude difference is shown as an impedance variation in the antenna coil terminal via the rectifying circuit 183.

In the transmitting circuit 155E of FIG. 7, the feedback system on the signal of VDDA is illustrated, but even when the MOS transistor 188 for voltage control is arranged between both ends of the antenna coil terminal, the same effects can be obtained. For the sake of simplicity of description, FIG. 7 has been described in connection with the example in which the resistor 184 is short-circuited, but the impedance can be changed such that the resistance value $R_1$ of the resistor 184 is divided into several values and switching some resistors to any one of the effective state and the short-circuited state. Further, the rectifying circuit 183 and the rectifying circuit 157 of FIG. 2 may be implemented as a single circuit.

The circuit configurations of FIGS. 3 to 7 are examples, and it is possible to employ another circuit configuration capable of performing load modulation.

The transmitting circuit 155 has the above-described configuration.

<Operation of Communication Device>

Next, an operation of the communication device 101 will be described with reference to FIG. 8, focusing on an operation of the transmitting circuit 155 of the integrated circuit 112.

Figure 8:
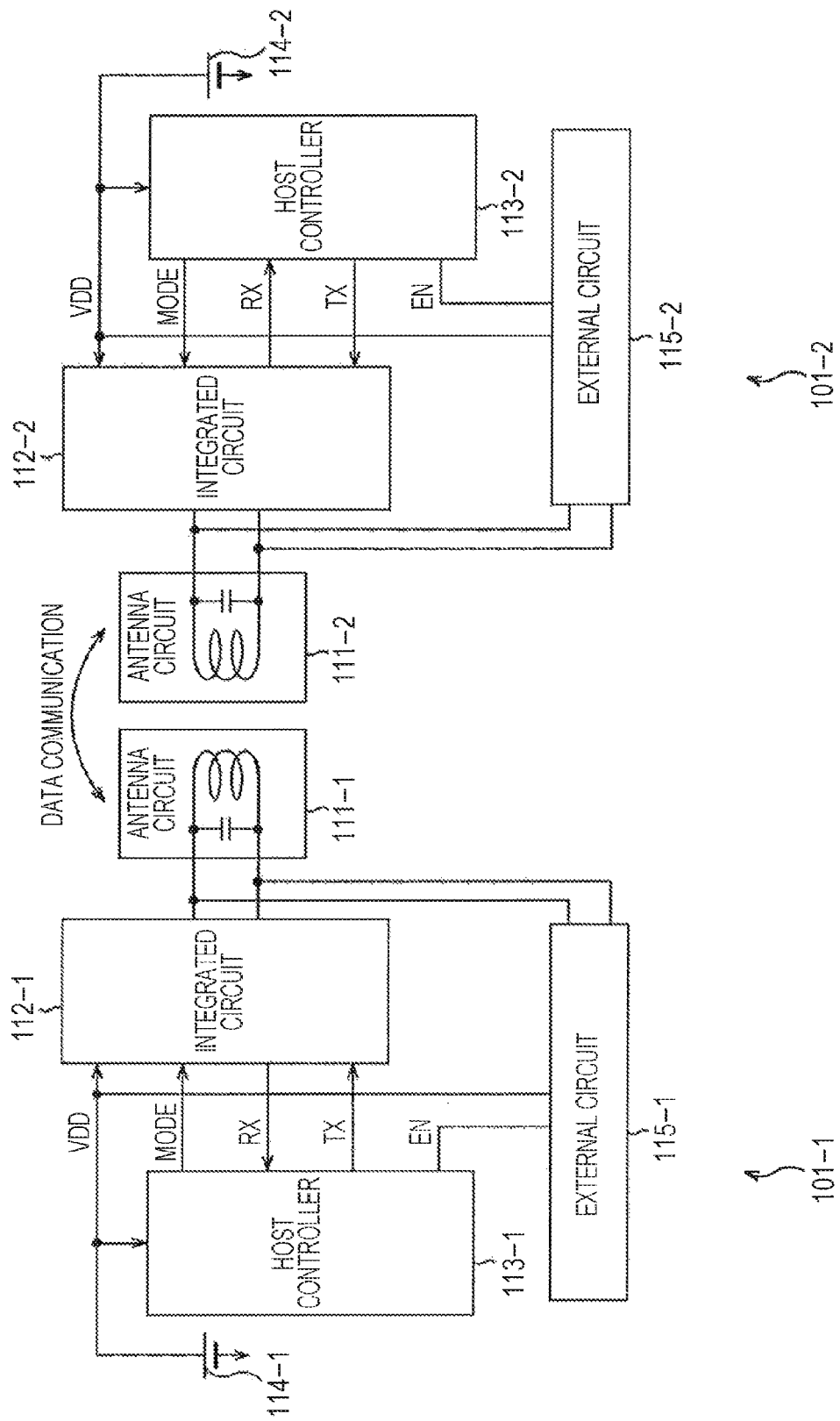
FIG. 8 is a diagram for describing an operation of a communication device.

In an example of FIG. 8, a communication device 101-1 and a communication device 101-2 are arranged at positions at which Near Field communication can be performed, the communication device 101-1 is assumed to operate in the reader/writer mode, and the communication device 101-2 is assumed to operate in the tag mode. Further, detailed internal configurations of an integrated circuit 112-1, an external circuit 115-1, an integrated circuit 112-2, and an external circuit 115-2 are omitted, but the circuits have the configurations illustrated in FIG. 2, and thus "−1" is added to reference numerals of internal circuits of the former, and "−2" is added to reference numerals of internal circuits of the latter.

(Operation of Communication Device 101-1: Reader/Writer Mode)

First, the communication device 101-1 operating in the reader/writer mode will be described.

When the communication device 101-1 operates in the reader/writer mode, the control signal (MODE) is supplied from the host controller 113-1 to the mode control unit 171-1 of the integrated circuit 112-1. The mode control unit 171-1 performs control according to the control signal (MODE) given from the host controller 113-1 such that the respective units of the integrated circuit 112-1 such as the transmitting circuit 155-1 and the receiving circuit 158-1 operate in the reader/writer mode. For example, the host controller 113-1 checks whether or not another reader/writer around the communication device 101-1 is generating a magnetic field, and supplies the control signal (MODE) indicating transition to the reader/writer mode to the mode control unit 171-1 when another reader/writer is generating no magnetic field.

The control signal (EN) is supplied from the host controller 113-1 to the external circuit 115-1. The switch 193-1 enters the ON state according to the control signal (EN) given from the host controller 113-1. As a result, electric power is supplied from the power source 114-1 to the oscillating circuit 191-1, and the oscillating circuit 191-1 starts to generate the oscillation signal.

The tri-state inverter circuit 194-1 and the tri-state buffer circuit 197-1 cause their output states to transition from the high impedance output state to the normal output state according to the control signal (EN) given from the host controller 113-1.

The tri-state inverter circuit 194-1 inverts the oscillation signal received from the oscillating circuit 191-1, and supplies the inverted oscillation signal to the filter circuit 195-1. The filter circuit 195-1 generates the carrier of 13.56 MHz based on the oscillation signal from the tri-state inverter circuit 194-1.

The tri-state buffer circuit 197-1 supplies the oscillation signal received from the oscillating circuit 191-1 to the filter circuit 198-1. The filter circuit 198-1 generates the carrier of 13.56 MHz based on the oscillation signal from the tri-state buffer circuit 197-1.

As a result, the carrier of 13.56 MHz based on the outputs of the filter circuit 195-1 and the filter circuit 198-1 is generated in the antenna circuit 111-1. Further, the impedance of the parallel resonant circuit of the antenna circuit 111 has a value of a predetermined magnitude through the impedance circuit 196-1 and the impedance circuit 199-1.

In other words, when the communication device 101-1 operates in the reader/writer mode, the carrier of 13.56 MHz is generated in the antenna circuit 111-1 by the external circuit 115-1.

The host controller 113-1 supplies transmission data that is transmitted to the communication device 101-2 of the communication destination to the data input circuit 153-1. The communication control unit 172-1 encodes the transmission data input from the host controller 113-1 according to the Manchester scheme. The transmitting circuit 155-1 performs the load modulation on the carrier generated in the antenna circuit 111-1 by the external circuit 115-1 by changing the impedance of the parallel resonant circuit of the antenna circuit 111-1 according to the Manchester-encoded transmission data received from the communication control unit 172-1.

As a result, the modulated signal is transmitted from the communication device 101-1 to the communication device 101-2 of the communication destination through the carrier. Then, the communication device 101-2 converts the AC voltage obtained from the carrier generated in the antenna circuit 111-1 of the communication device 101-1 into the DC voltage, starts its operation, and transmits reply data by performing the load modulation in a state in which the modulated signal is received from the communication device 101-1.

As a result, the modulated signal generated by the load modulation performed by the communication device 101-2 of the communication destination is induced in the antenna circuit 111-1 of the communication device 101-1. The receiving circuit 158-1 demodulates the modulated signal based on the output from the rectifying circuit 157-1. Then, the communication control unit 172-1 decodes the Manchester encoded reception data received from the receiving circuit 158-1, and supplies the decoded reception data to the host controller 113-1 through the data output circuit 154-1.

The communication device 101-1 operating in the reader/writer mode has been described above.

(Operation of Communication Device 101-2: Tag Mode)

Next, an operation of the communication device 101-2 operating in the tag mode will be described.

When the communication device 101-2 approaches the communication device 101-1 operating in the reader/writer mode, the carrier radiated from the antenna circuit 111-1 of the communication device 101-1 is received by the antenna circuit 111-2. At this time, the received AC voltage generated in the antenna circuit 111-2 is converted into the DC voltage through the rectifying circuit 157-2, and the communication device 101-2 acquires a power voltage necessary for its operation and starts its operation. Here, the power voltage may be supplied from the power source 114-2, and the power voltage may be selected by the power selecting circuit 159-2.

When the communication device 101-2 starts its operation, the control signal (MODE) is supplied from the host controller 113-2 to the mode control unit 171-2. The mode control unit 171-2 performs control according to the control signal (MODE) given from the host controller 113-2 such that the respective units of the integrated circuit 112-2 such as the transmitting circuit 155-2 and the receiving circuit 158-2 operate in the tag mode.

The control signal (EN) is supplied from the host controller 113-2 to the external circuit 115-2. The switch 193-2 enters the OFF state according to the control signal (EN) given from the host controller 113-2. As a result, electric power from the power source 114-2 is not supplied to the oscillating circuit 191-2, and the generation of the oscillation signal is stopped.

The tri-state inverter circuit 194-2 and the tri-state buffer circuit 197-2 cause the output state to transition to the high impedance output state according to the control signal (EN) given from the host controller 113-2. As a result, the outputs of the tri-state inverter circuit 194-2 and the tri-state buffer circuit 197-2 become the high impedance state.

In other words, when the communication device 101-2 operates in the tag mode, since the carrier generated by the communication device 101-1 of the communication destination is used, no carrier is generated in the external circuit 115-2.

When the modulated signal that has been subjected to the load modulation by the communication device 101-1 of the communication destination is received by the antenna circuit 111-2, the receiving circuit 158-2 demodulates the modulated signal based on the output from the rectifying circuit 157-2. The communication control unit 172-2 decodes the Manchester-encoded reception data received from the receiving circuit 158-2, and supplies the decoded reception data to the host controller 113-2 through the data output circuit 154-2.

The host controller 113-2 supplies transmission data to be replied to the communication device 101-1 of the communication destination to the data input circuit 153-2 in response to the reception data received from the data output circuit 154-2. The communication control unit 172-2 encodes the transmission data input from the host controller 113-2 according to the Manchester scheme. The transmitting circuit 155-2 performs the load modulation on the Manchester-encoded transmission data received from the communication control unit 172-2 by changing the impedance of the parallel resonant circuit of the antenna circuit 111-2, and transmits the resultant transmission data to the communication device 101-1 of the communication destination.

As a result, the modulated signal is transmitted from the communication device 101-2 to the communication device 101-1 of the communication destination through the load modulation.

The communication device 101-2 operating in the tag mode has been described above.

As described above, in the communication device 101, when the operation is performed in the reader/writer mode, the integrated circuit 112 transmits the transmission data to the communication destination by performing the load modulation of changing the impedance of the parallel resonant circuit of the antenna circuit 111 according to the transmission data using the carrier generated in the antenna circuit 111 by the external circuit 115. Further, when the operation is performed in the tag mode, the integrated circuit 112 receives data transmitted from the communication destination, and transmits transmission data to be transmitted in response to the reception data to the communication destination using the load modulation.

In other words, at the time of transmission in the reader/writer mode, the integrated circuit 112 modulates the transmission data using the same load modulation scheme as the time of transmission in the tag mode without using the ASK modulation scheme, and thus it is unnecessary to install a plurality of transmitting circuits according to the modulation schemes, and the transmitting circuit is commonalized. In the configuration of FIG. 2, the transmitting circuit 155 is provided as a transmitting circuit dedicated for a load modulation scheme. This can be implemented using the fact that the same coding scheme (for example, the Manchester scheme) is used at the time of transmission and reception according a predetermined standard (for example, FeliCa (a registered trademark)). Further, in the configuration of FIG. 2, since the same coding scheme for example, the Manchester scheme) is used at the time of transmission and reception according as a predetermined standard, an encoding circuit (not illustrated) of the communication control unit 172 is also commonalized.

Through this configuration, the transmitting circuit 155 is commonalized in the reader/writer mode and the tag mode, and the manufacturing cost is reduced, and it is consequently possible to provide the communication device 101 at a low price. Further, when attention is given to the integrated circuit 112, the transmitting circuit 155 can be commonalized, and the external circuit 115 that generates the carrier can be mounted as a separate circuit, and this it is possible to provide the integrated circuit 112 at a low price and reduce a circuit size.

In the example of FIG. 8, the communication device 101-1 operates in the reader/writer mode, and the communication device 101-2 operates in the tag mode, but conversely, the communication device 101-1 may operate in the tag mode, and the communication device 101-2 may operate in the reader/writer mode.

Further, in the example of FIG. 8, the communication device 101 has been described as the communication destination, but an external device having only one of functions of the RF tag and the reader/writer may be the communication destination.

The operation of the communication device 101 has been described above.

By the way, there are cases where an RF tag or a non-contact type IC card has a configuration in which a voltage does not increase to be a predetermined set voltage or higher due to a withstand voltage of an integrated circuit (chip) or a relation with a communication performance or the like. In this case, when an RF tag or the like is held over a magnetic field in which a power voltage of a set voltage or higher, a waveform of a carrier is likely to be distorted.

In other words, when the communication device 101 operates in the reader/writer mode, if the set voltage is too low, a radio frequency component is likely to be problematic due to distortion (for example, a sine wave gets close to a square wave) of a waveform of a carrier. As described above, in the case of the reader/writer mode, since the carrier is transmitted, it is necessary to maintain a waveform of a sine wave, but in the case of the tag mode, it is unnecessary to maintain a waveform of a sine wave, and thus carrier distortion is not problematic.

Figure 9:
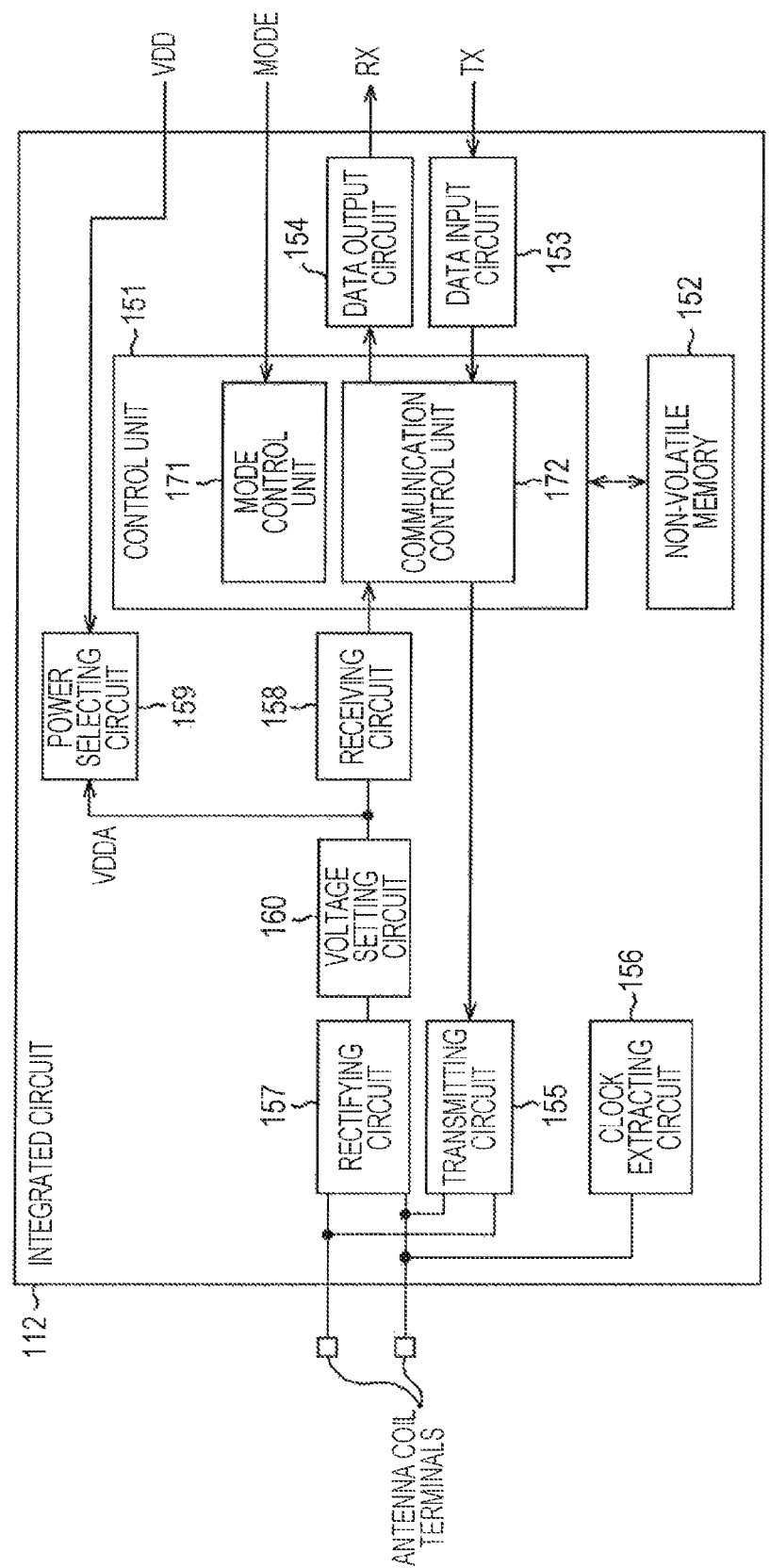
FIG. 9 is a diagram for describing a change in a set voltage according to an operation mode.

In this regard, as illustrated in FIG. 9, in the integrated circuit 112, a voltage setting circuit 160 may be additionally provided and set a voltage value according to an operation mode. Specifically, for example, the voltage setting circuit 160 includes a step-down element (for example, a resistor element, a diode element, or the like), a switch of turning on or off the step-down element according to an operation state, and a shunt regulator circuit, and is installed behind the rectifying circuit 157. The voltage setting circuit 160 performs control according to control of the mode control unit 171 such that a voltage value of the DC voltage converted by the rectifying circuit 157 does not increase to be a set voltage or higher.

For example, in the case of the reader/writer mode, the voltage setting circuit 160 sets a voltage between the antenna coil terminals to a set voltage of 8 V by validating the step-down element by the control signal (MODE) and increasing a set voltage of the shunt regulator circuit. Meanwhile, in the case of the tag mode, the voltage setting circuit 160 sets the voltage between the antenna coil terminals to a set voltage of 4 V by invalidating the step-down element by the control signal (MODE) and decreasing the set voltage of the shunt regulator circuit. As a result, in the integrated circuit 112, when the operation is performed in the reader/writer mode, even when a high voltage is set for a high output, the waveform of the sine wave of the carrier is maintained. Further, in the integrated circuit 112, when the operation is performed in the tag mode, since a low set voltage is set, for example, it is possible to reliably prevent an integrated circuit (chip) from being broken.

Here, when the operation is performed in the reader/writer mode, the voltage setting circuit 160 may fixedly set the set voltage for the tag mode as the set voltage regardless of the operation mode as long as the set voltage for the tag mode does not cause any problem in the waveform of the sine wave of the carrier.

Second Embodiment

<Configuration of Communication System>

Figure 10:
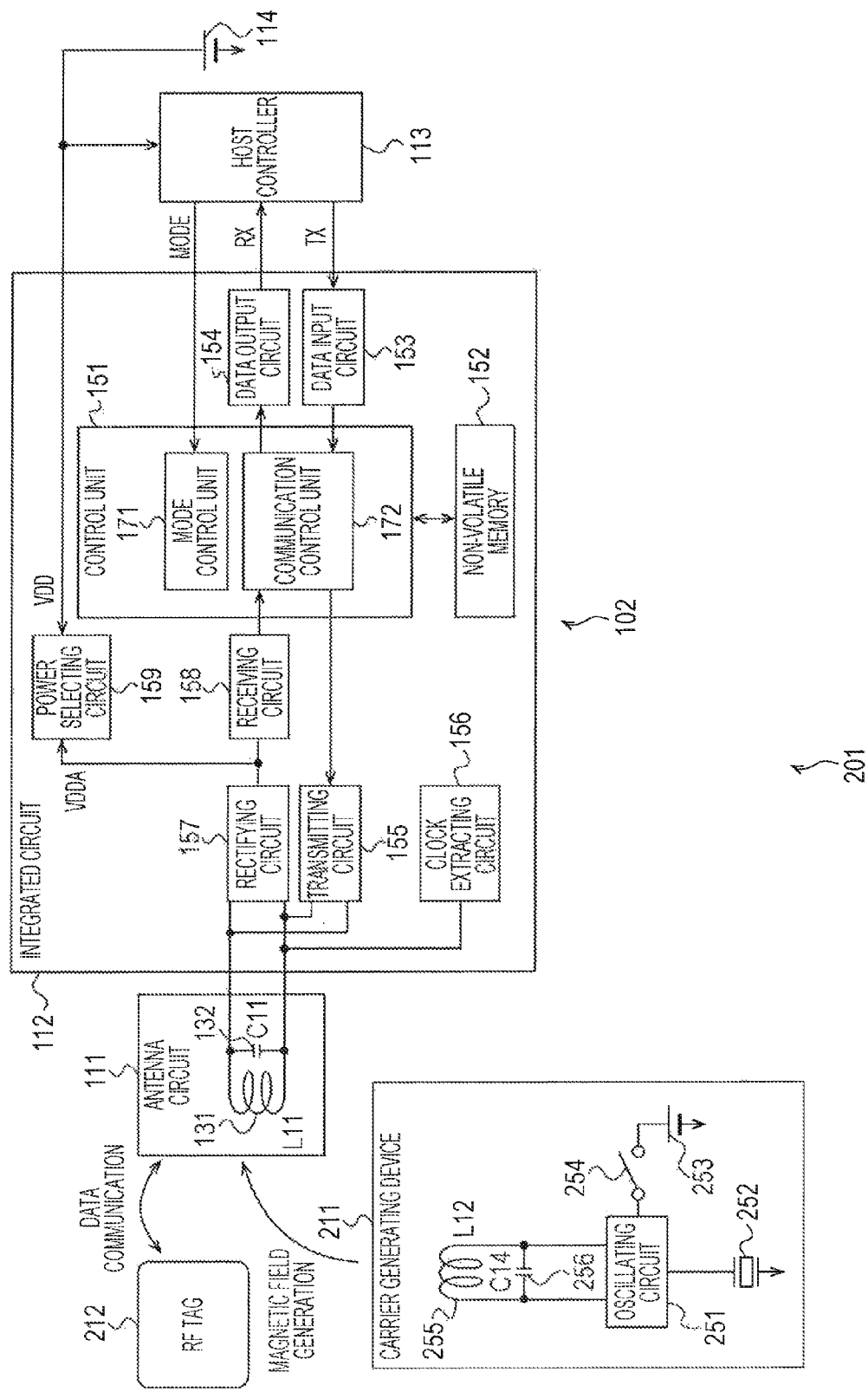
FIG. 10 is a diagram illustrating a configuration of a communication system according to an embodiment of the present technology.

FIG. 10 is a diagram illustrating a configuration of a communication system according to an embodiment of the present technology.

As illustrated in FIG. 10, a communication system 201 includes a communication device 102, a carrier generating device 211, and an RF tag 212. Here, in FIG. 10, the communication device 102 operates in the reader/writer mode, and performs Near Field communication with the RF tag 212 of the communication destination.

The communication device 102 includes an antenna circuit 111, an integrated circuit 112, a host controller 113, and a power source 114. In the communication device 102, the antenna circuit 111, the integrated circuit 112, the host controller 113, and the power source 114 have configurations similar to the antenna circuit 111, the integrated circuit 112, the host controller 113, and the power source 114 of FIG. 2.

In other words, the communication device 102 has a configuration in which the external circuit 115 generating the carrier is removed from the communication device 101 of FIG. 2. Thus, in the communication system 201, the carrier generating device 211 that generates the carrier is installed instead of the external circuit 115.

The carrier generating device 211 includes an oscillating circuit 251, a crystal oscillator 252, a power source 253, a switch 254, a coil 255, and a capacitor 256.

The oscillating circuit 251 generates an oscillation signal corresponding to a vibration frequency of the crystal oscillator 252.

When the switch 254 enters the ON state, the power source 253 supplies the power voltage to the oscillating circuit 251. Here, the switch 254 performs the ON/OFF switching operation according to control of a higher host controller (not illustrated).

The coil 255 and the capacitor 256 form a parallel resonant circuit 112 indicates inductance of the coil 255, and C14 indicates capacitance of the capacitor.

Here, an operation of the carrier generating device 211 will be described. In the carrier generating device 211, when the switch 254 transitions from the OFF state to the ON state, the power voltage is supplied from the power source 253 to the oscillating circuit 251. The oscillating circuit 251 starts its operation according to the power voltage supplied from the power source 253, and generates the oscillation signal corresponding to the vibration frequency of the crystal oscillator 252.

The oscillation signal is applied to the parallel resonant circuit configured with the coil 255 and the capacitor 256, and a magnetic field is generated. As a result, a carrier (carrier wave) of a predetermined frequency (13.56 MHz) is generated in the antenna circuit 111 of the communication device 102.

When the operation is performed in the reader/writer mode, if it enters a communicable state with the RF tag 212 of the communication destination, the transmitting circuit 155 of the communication device 102 performs the load modulation on the carrier generated in the antenna circuit 111 by the carrier generating device 211 by changing the impedance of the parallel resonant circuit of the antenna circuit 111 according to the transmission data received from the communication control unit 172. As a result, the modulated signal is transmitted from the communication device 102 to the RF tag 212 of the communication destination.

Meanwhile, the RF tag 212 converts the AC voltage obtained from the carrier generated in the antenna circuit 111 of the communication device 102 into the DC voltage, starts its operation, and transmits reply data by performing the load modulation in a state in which the modulated signal is received from the communication device 102.

The modulated signal generated by the load modulation performed by the RF tag 212 of the communication destination is induced in the antenna circuit 111 of the communication device 102. The receiving circuit 158 demodulates the modulated signal generated in the antenna circuit 111 based on the output from the rectifying circuit 157, and supplies reception data obtained by the demodulating to the communication control unit 172.

As described above, in the communication system 201, the communication device 102 does not include the external circuit 115, and transmits the transmission data to the RF tag 212 of the communication destination by performing the load modulation on the carrier in the antenna circuit 111 by the carrier generating device 211.

In other words, in the communication device 102, the transmission data is modulated using the same load modulation scheme at the time of transmission in the reader/writer mode and the tag mode, and thus data can be transmitted and received using the carrier generated by the carrier generating device 211.

Through this configuration, it is unnecessary to mount the external circuit 115 in the communication device 102, and thus it is possible to reduce the size of the communication device 102 and provide the communication device 102 at a low price.

The communication system 201 has the above-described configuration.

Third Embodiment

<Configuration of Electronic Instrument>

Figure 11:
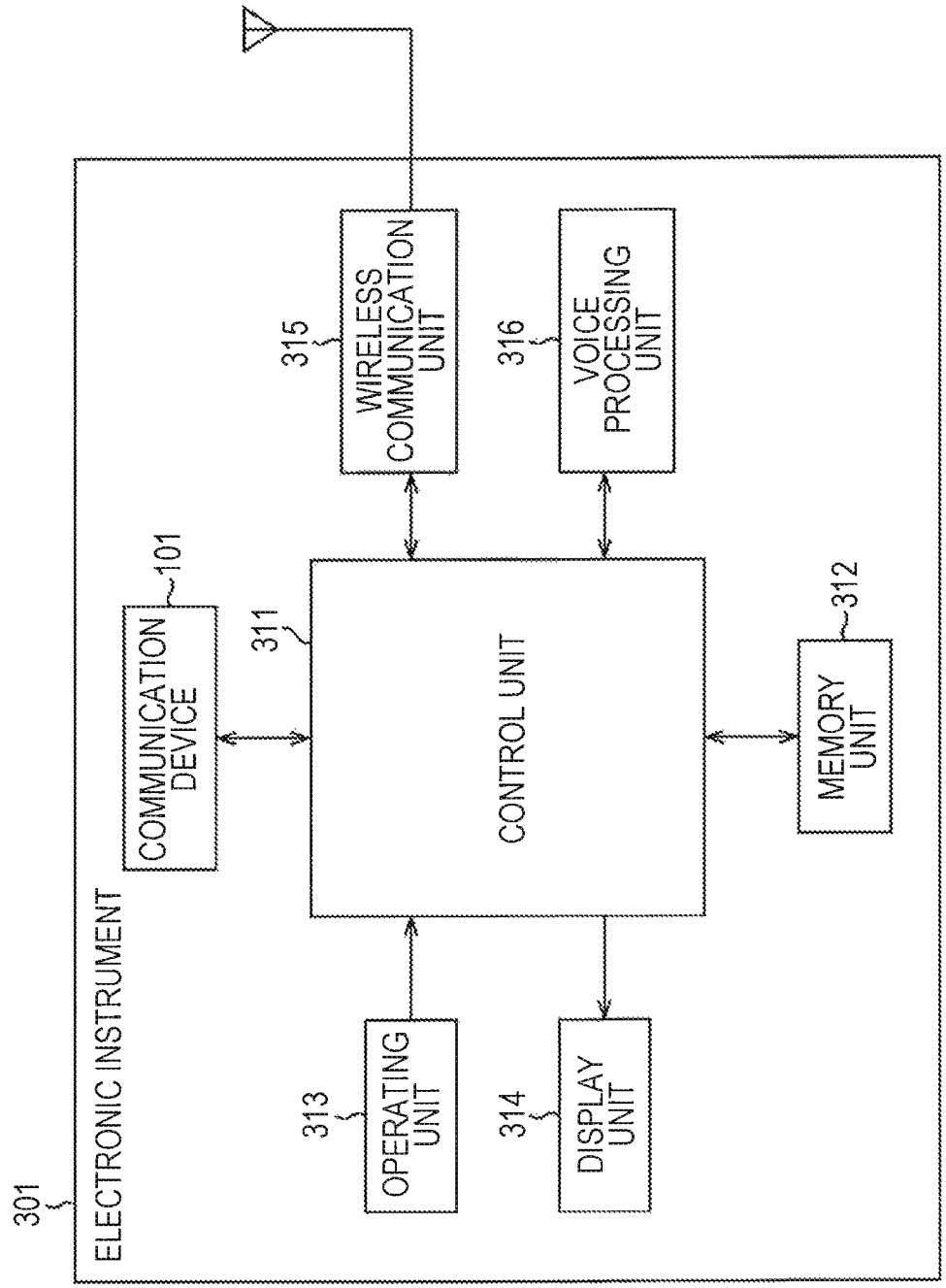
FIG. 11 is a diagram illustrating a configuration of an electronic instrument according to an embodiment of the present technology.

FIG. 11 is a diagram illustrating a configuration of an electronic instrument according to an embodiment of the present technology.

For example, an electronic instrument 301 is a portable information device or a portable communication device such as a mobile telephone, a smart phone, or a tablet PC. As illustrated in FIG. 11, the electronic instrument 301 includes a communication device 101, a control unit 311, a memory unit 312, an operating unit 313, a display unit 314, a wireless communication unit 315, and a voice processing unit 316.

The control unit 311 controls the respective units of the electronic instrument 301. The memory unit 312 holds various kinds of data according to control of the control unit 311.

The control unit 311 has the function of the host controller 113 (for example, FIG. 2) described above, and controls the operation mode of the communication device 101. The communication device 101 operates in the reader/writer mode or the tag mode according to control of the control unit 311.

When the operation is performed in the reader/writer mode, the communication device 101 transmits transmission data to an RF tag of a communication destination (not illustrated) using the load modulation scheme according to control of the control unit 311. Further, the communication device 101 receives reply data transmitted from the RF tag of the communication destination according to control of the control unit 311.

Further, when the operation is performed in the tag mode, the communication device 101 receives data transmitted from a reader/writer of a communication destination (not illustrated) according to control of the control unit 311. Furthermore, the communication device 101 transmits reply transmission data to the reader/writer of the communication destination using the load modulation scheme according to control of the control unit 311.

The operating unit 313 supplies an operation signal according to a user's operation to the control unit 311. The control unit 311 controls the operations of the respective units of the electronic instrument 301 according to the operation signal given from the operating unit 313. For example, the operating unit 313 may be a physical button and may be a Graphical User Interface (GUI) image displayed on a screen of the display unit 314 having a touch panel.

The display unit 314 is configured with a display device such as a Liquid Crystal Display (LCD). The display unit 314 displays various kinds of information such as a text or an image according to control of the control unit 311.

The wireless communication unit 315 performs wireless communication with a predetermined server via a network such as the Internet according to control of the control unit 311.

The voice processing unit 316 includes a device for performing a voice call such as a microphone or a speaker 10. The voice processing unit 316 performs a voice input process or a voice output process according to control of the control unit 311.

The electronic instrument 301 has the above described configuration.

As described above, since the communication device 101 is mounted in the electronic instrument 301, for example, when another electronic instrument having an RF tag function is held over the electronic instrument 301, the communication device 101 operates in the reader/writer mode, and performs transmission and reception of data with another electronic instrument. For example, when the electronic instrument 301 is held over a reader/writer equipped in a ticket gate of a station or a cache register of a store, the communication device 101 operates in the tag mode, and performs transmission and reception of data with the reader/writer.

As described above, according to the present technology, the transmitting circuit 155 is commonalized in the reader/writer mode and the tag mode, and the manufacturing cost is lowered, and thus it is possible to provide the communication device 101 (FIG. 2), the communication device 102 (FIG. 10), or the electronic instrument 301 (FIG. 11) at a low price. In other words, in the past, since it is necessary to install the transmitting circuit 57 for the reader/writer mode and the transmitting circuit 61 for the tag mode separately as illustrated in FIG. 1, it is necessary to commonalize the transmitting circuits dedicated for the modes and reduce the manufacturing cost, but this demand can be satisfied by the present technology.

Figure 1:
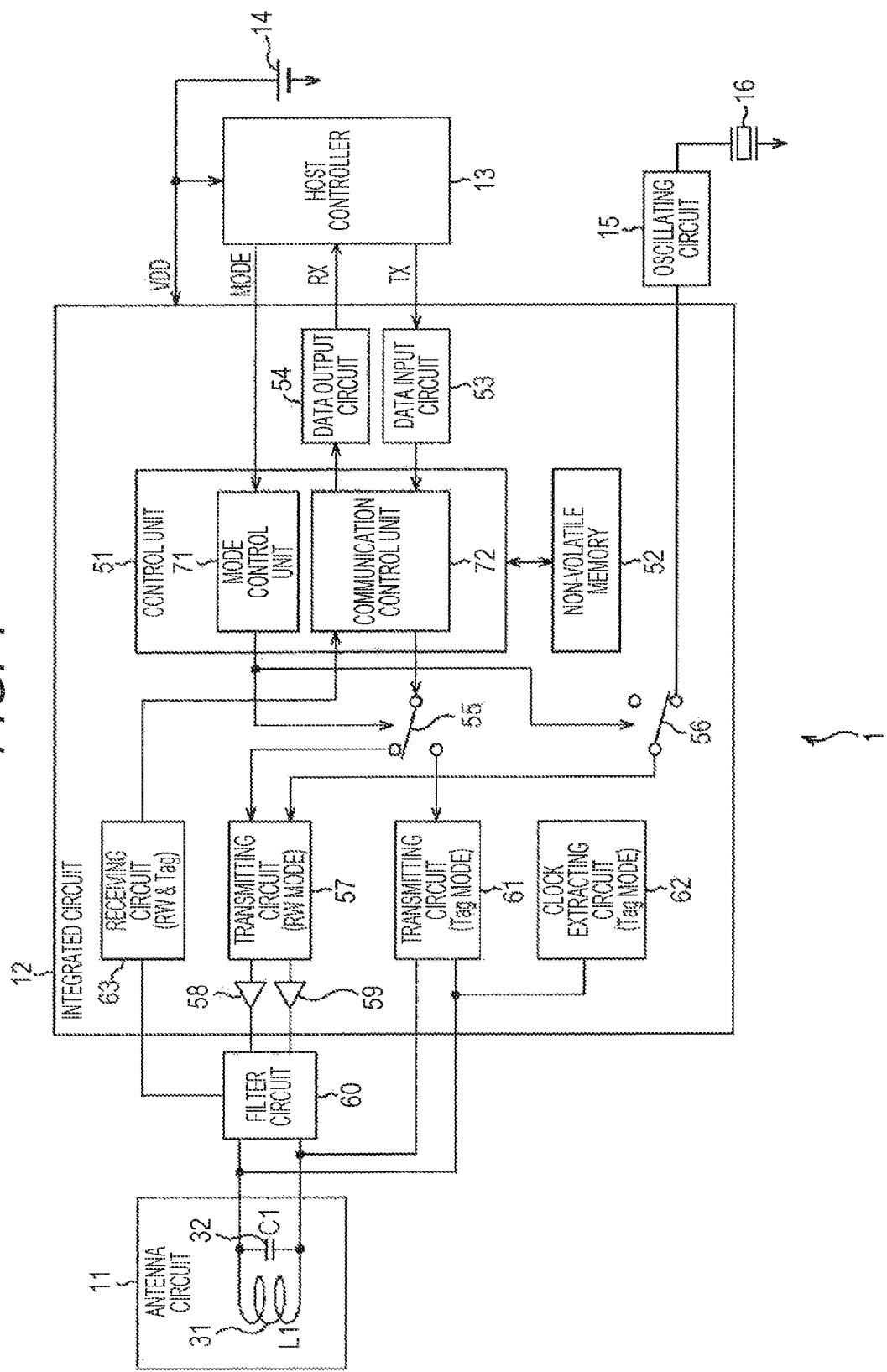
FIG. 1 is a diagram illustrating a configuration of a communication device having both functions of an RF tag and reader/writer.

Further, when attention is given to the integrated circuit 112 (for example, FIG. 2), in the past, the circuit for generating the carrier such as the oscillating circuit 15 or the crystal oscillator 16 is necessary as illustrated in FIG. 1, but in the present technology, since a separate circuit can be mounted as the external circuit 115, it is possible to provide the integrated circuit 112 at a low price and reduce the circuit size.

In addition, the communication device 102 (FIG. 10) can perform transmission and reception of data using the carrier generated by the carrier generating device 211 instead of the external circuit 115 without including the external circuit 115 serving as a separate circuit from the integrated circuit 112. Thus, since Near Field communication can be performed through the carrier generating device 211, the size and the cost of the communication device 102 can be reduced. Moreover, since the external circuit 115 is not mounted in the communication device 102, power consumption can be reduced.

Further, the communication system can be constructed without using the carrier generating device 211 such that the integrated circuit 112 and the external circuit 115 are mounted on the same substrate, and Near Field communication can be performed among all electronic instruments equipped with a module in which the integrated circuit 112 and the external circuit 115 are mounted.

Further, in the integrated circuit 12 (FIG. 1) of the related art, when the operation is performed in the reader/writer mode, the ASK modulation of driving the carrier at a low impedance and modulating an amplitude compulsorily is used, and thus it is necessary to change a level thereof compulsorily while driving the carrier at the low impedance. To this end, the transmitting buffer circuits 58 and 59 are installed behind the transmitting circuit 57. On the other hand, according to the present technology, even when the operation is performed in the reader/writer mode, the load modulation scheme is used and in the load modulation scheme, an impedance (for example, about several hundreds to 1 KΩ) of a certain magnitude is applied, and the modulation is performed according to an amount of change in an impedance, and thus the transmitting buffer circuits 58 and 59 are unnecessary in the integrated circuit 112 (for example, FIG. 2). Thus, since it is unnecessary to install the transmitting buffer circuits 58 and 59, the size and the cost can be reduced.

The above description has proceeded in connection with the example in which a communication target when the communication device 101, the communication device 102, or the electronic instrument 301 operates in the reader/writer mode is an RF tag, but the present technology is not limited to this example, and, for example, communication devices performing Near Field communication with an RFID reader/writer according to an electromagnetic coupling scheme such as a non-contact type IC card can serve as a communication target.

The embodiments of the present technology are not limited to the above examples, and various changes can be made within the scope not departing from the gist of the present technology.

Further, the present technology may have the following configurations.

(1)

A communication device, including:

an antenna unit;

a transmitting unit that modulates transmission data, and transmits the transmission data to a communication destination through the antenna unit; and a receiving unit that receives modulated reception data from the communication destination through the antenna unit, and demodulates the modulated reception data, wherein the transmitting unit and the receiving unit operate in any one of a first operation mode in which an operation of a radio frequency identification (RFID) reader/writer is performed and a second operation mode in which an operation of a communication target of the RFID reader/writer is performed, the transmitting unit transmits the transmission data to the communication target by performing load modulation of changing an impedance of the antenna unit according to the transmission data using a first carrier generated in the antenna unit when the transmitting unit operates in the first operation mode, and the transmitting unit transmits the transmission data to the RFID reader/writer by performing the load modulation of changing the impedance of the antenna unit according to the transmission data using a second carrier received by the antenna unit when the transmitting unit operates in the second operation mode.

(2)

The communication device according to (1), further including:

a carrier generating unit that generates the first carrier.

(3)

The communication device according to (2), wherein the carrier generating unit causes the impedance of the antenna unit to have a value of a predetermined magnitude.

(4)

The communication device according to (1), wherein the first carrier is generated by an external carrier generating device.

(5)

The communication device according to any one of (1) to (4), wherein the transmission data and the reception data are encoded by the same coding scheme.

(6)

The communication device according to any one of (1) to (5), further including:

a voltage setting unit that restricts a power voltage generated by electromagnetic induction of the antenna unit according to the operation mode.

(7)

A communication method of a communication device including:

an antenna unit, a transmitting unit that modulates transmission data, and transmits the transmission data to a communication destination through the antenna unit, and a receiving unit that receives modulated reception data from the communication destination through the antenna unit, and demodulates the modulated reception data, the communication method including:

causing the transmitting unit and the receiving unit to operate in any one of a first operation mode in which an operation of an RFID reader/writer is performed and a second operation mode in which an operation of a communication target of the RFID reader/writer is performed, transmitting, by the transmitting unit, the transmission data to the communication target by performing load modulation of changing an impedance of the antenna unit according to the transmission data using a first carrier generated in the antenna unit when the transmitting unit operates in the first operation mode, and transmitting, by the transmitting unit, the transmission data to the RFID reader/writer by performing the load modulation of changing the impedance of the antenna unit according to the transmission data using a second carrier received by the antenna unit when the transmitting unit operates in the second operation mode.

(8)

An integrated circuit, including:

a transmitting circuit that modulates transmission data, and transmits the transmission data to a communication destination through an external antenna circuit; and a receiving circuit that receives modulated reception data from the communication destination through the antenna circuit, and demodulates the modulated reception data, wherein the transmitting circuit and the receiving circuit operate in any one of a first operation mode in which an operation of an RFID reader/writer is performed and a second operation mode in which an operation of a communication target of the RFID reader/writer is performed, the transmitting circuit transmits the transmission data to the communication target by performing load modulation of changing an impedance of the antenna circuit according to the transmission data using a first carrier generated in the antenna circuit when the transmitting circuit operates in the first operation mode, and the transmitting circuit transmits the transmission data to the a RFID reader/writer by performing the load modulation of changing the impedance of the antenna circuit according to the transmission data using a second carrier received by the antenna circuit when the transmitting circuit operates in the second operation mode.

(9)

The integrated circuit according to (8), wherein the first carrier is generated by an external carrier generating circuit.

(10)

The integrated circuit according to (9), wherein the carrier generating circuit causes the impedance of the antenna circuit to have a value of a predetermined magnitude.

(11)

The integrated circuit according to any one of (8) to (10), wherein the transmission data and the reception data are encoded by the same coding scheme.

(12)

The integrated circuit according to any one of (8) to (11), further including:

a voltage setting circuit that restricts a power voltage generated by electromagnetic induction of the antenna circuit according to the operation mode.

(13)

A communication method of an integrated circuit including:

a transmitting circuit that modulates transmission data, and transmits the transmission data to a communication destination through an external antenna circuit, and a receiving circuit that receives modulated reception data from the communication destination through the antenna circuit, and demodulates the modulated reception data, the communication method including:

causing the transmitting circuit and the receiving circuit to operate in any one of a first operation mode in which an operation of an RFID reader/writer is performed and a second operation mode in which an operation of a communication target of the RFID reader/writer is performed, transmitting, by the transmitting circuit, the transmission data to the communication target by performing load modulation of changing an impedance of the antenna circuit according to the transmission data using a first carrier generated in the antenna circuit when the transmitting circuit operates in the first operation mode, and transmitting, by the transmitting circuit, the transmission data to the RFID reader/writer by performing the load modulation of changing the impedance of the antenna circuit according to the transmission data using a second carrier received by the antenna circuit when the transmitting circuit operates in the second operation mode.

(14)

An electronic instrument equipped with a communication device, the communication device including:

an antenna unit;

a transmitting unit that modulates transmission data, and transmits the transmission data to a communication destination through the antenna unit; and a receiving unit that receives modulated reception data from the communication destination through the antenna unit, and demodulates the modulated reception data, wherein the transmitting unit and the receiving unit operate in any one of a first operation mode in which an operation of an RFID reader/writer is performed and a second operation mode in which an operation of a communication target of the RFID reader/writer is performed, the transmitting unit transmits the transmission data to the communication target by performing load modulation of changing an impedance of the antenna unit according to the transmission data using a first carrier generated in the antenna unit when the transmitting unit operates in the first operation mode, and the transmitting unit transmits the transmission data to the RFID reader/writer by performing the load modulation of changing the impedance of the antenna unit according to the transmission data using a second carrier received by the antenna unit when the transmitting unit operates in the second operation mode.

REFERENCE SIGNS LIST 101, 102 Communication device
111 Antenna circuit
112 Integrated circuit
113 Host controller
114 Power source
115 External circuit
131 Coil
132 Capacitor
151 Control unit
152 Non-volatile memory
153 Data input circuit
154 Data output circuit
155, 155A, 155B, 155C, 155D, 155E Transmitting circuit
156 Clock extracting circuit
157 Rectifying circuit
158 Receiving circuit
159 Power selecting circuit
160 Voltage setting circuit
171 Mode control unit
172 Communication control unit
191 Oscillating circuit
192 Crystal oscillator
193 Switch
194 Tri-state inverter circuit
195, 198 Filter circuit
196, 199 Impedance circuit
197 Tri-state buffer circuit
201 Communication system
211 Carrier generating device
212 RF tag
251 Oscillating circuit
252 Crystal oscillator
253 Power source
254 Switch
255 Coil
256 Capacitor
301 Electronic instrument
311 Control unit

The invention claimed is:

1. A communication device, comprising:
an oscillator circuit configured to generate a first carrier wave at an antenna unit; and
a modulator unit configured to modulate the first carrier wave by changing an impedance of the antenna unit according to transmission data when the communication device operates as an RFID reader/writer,
wherein the transmission data is encoded by the communication device using a same coding scheme as a coding scheme according to which a reception data that is received via a second carrier wave transmitted from another communication device when the communication device operates as an RF tag has been encoded, the another communication device being separate from the communication device, and the reception data being received at the same antenna unit having the impedance being changed when the communication device operates as the RFID reader/writer, and
wherein the modulator unit is implemented via at least one processor.

2. The communication device according to claim 1,
wherein the modulator unit is further configured to modulate the second carrier wave by changing an impedance of the antenna unit according to transmission data when the communication device operates as the RFID tag, and
wherein the second carrier wave is generated by an external device at the antenna unit.

3. The communication device according to claim 2, wherein the oscillator circuit causes the impedance of the antenna unit to have a value of a predetermined magnitude.

4. The communication device according to claim 1, further comprising:
a voltage setting unit that restricts a power voltage generated by electromagnetic induction of the antenna unit according to operation mode,
wherein the voltage setting unit is implemented via at least one processor.

5. A communication method of a communication device, the method comprising:
generating a first carrier wave at an antenna unit by an oscillator circuit and modulating the first carrier wave by changing an impedance of the antenna unit according to transmission data when the communication device operates within an RFID reader/writer, wherein the transmission data is encoded by the communication device using a same coding scheme as a coding scheme according to which a reception data that is received via a second carrier wave transmitted from another communication device when the communication device operates as an RF tag has been encoded, the another communication device being separate from the communication device, and the reception data being received at the same antenna unit having the impedance being changed when the communication device operates as the RFID reader/writer; and
receiving the second carrier wave at the antenna unit and modulating the second carrier wave by changing an impedance of the antenna unit according to transmission data when the communication device operates as the RFID wherein the second carrier wave is generated by an external device to which the tag,
transmission data is to be transmitted.

6. An integrated circuit, comprising:
an oscillator circuit configured to generate a first carrier wave at an antenna unit; and
a modulator unit configured to modulate the first carrier wave by changing an impedance of the antenna unit according to transmission data when the integrated circuit operates in an RFID reader/writer mode,
wherein the transmission data is encoded by the integrated circuit using a same coding scheme as a coding scheme according to which a reception data that is received via a second carrier wave transmitted from another communication device when the integrated circuit operates as an RF tag has been encoded, the another communication device being separate from the integrated circuit, and the reception data being received at the same antenna unit having the impedance being changed when the communication device operates as the RFID reader/writer, and
wherein the modulator unit is implemented via at least one processor.

7. The communication device according to claim 6,
wherein the modulator unit is further configured to modulate the second carrier wave by changing an impedance of the antenna unit according to transmission data when the communication device operates as the RFID tag, and
wherein the second carrier wave is generated by an external device at the antenna unit.

8. The integrated circuit according to claim 7, wherein the oscillator circuit causes the impedance of the antenna circuit to have a value of a predetermined magnitude.

9. The integrated circuit according to claim 6, further comprising:
a voltage setting circuit that restricts a power voltage generated by electromagnetic induction of the antenna circuit according to operation mode.

10. A communication method of an integrated circuit, the method comprising:
generating a first carrier wave at an antenna unit by an oscillator circuit and modulating the first carrier wave by changing an impedance of the antenna unit according to transmission data when the communication device operates within an RFID reader/writer, wherein the transmission data is encoded by the integrated circuit using a same coding scheme as a coding scheme according to which a reception data that is received via a second carrier wave transmitted from another communication device when the integrated circuit operates as an RF tag has been encoded, the another communication device being separate from the integrated circuit, and the reception data being received at the same antenna unit having the impedance being changed when the communication device operates as the RFID reader/writer; and
receiving the second carrier wave at the antenna unit and modulating the second carrier wave by changing an impedance of the antenna unit according to transmission data when the communication device operates as the RFID tag,
wherein the second carrier wave is generated by an external device to which the transmission data is to be transmitted.

11. An electronic instrument comprising a communication device, the communication device comprising:
an oscillator circuit configured to generate a first carrier wave at an antenna unit;
a modulator unit configured to modulate the first carrier wave by changing an impedance of the antenna unit according to transmission data when the integrated circuit operates in an RFID reader/writer mode,
wherein the transmission data is encoded by the communication device using a same coding scheme as a coding scheme according to which a reception data that is received via a second carrier wave transmitted from another communication device when the communication device operates as an RF tag has been encoded, the another communication device being separate from the communication device, and the reception data being received at the same antenna unit having the impedance being changed when the communication device operates as the RFID reader/writer, and wherein the modulator unit is implemented via at least one processor.

12. The communication device according to claim 1, wherein the coding scheme is a Manchester scheme.

13. The communication method according to claim 5, wherein the coding scheme is a Manchester scheme.

14. The integrated circuit according to claim 6, wherein the coding scheme is a Manchester scheme.

15. The communication method according to claim 10, wherein the coding scheme is a Manchester scheme.

16. The electronic instrument according to claim 11, wherein the coding scheme is a Manchester scheme.

* * * * *